(12) United States Patent
Zhang et al.

(10) Patent No.: US 7,260,257 B2
(45) Date of Patent: Aug. 21, 2007

(54) SYSTEM AND METHOD FOR WHITEBOARD AND AUDIO CAPTURE

(75) Inventors: Zhengyou Zhang, Redmond, WA (US); Ross Cutler, Duvall, WA (US); Zicheng Liu, Bellevue, WA (US); Anoop Gupta, Woodinville, WA (US); Li-wei He, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 864 days.

(21) Appl. No.: 10/178,443

(22) Filed: Jun. 19, 2002

(65) Prior Publication Data

US 2003/0234772 A1    Dec. 25, 2003

(51) Int. Cl.
  *C06K 9/00* (2006.01)
(52) U.S. Cl. .................................................... 382/165
(58) Field of Classification Search ................ 382/165, 382/224–225, 162, 305, 164, 176, 202–203, 382/278, 282; 348/699–700, 14.1, 273, 254, 348/335, 239, 36, 211.1–211.14, 207.99, 348/222.1, 14.01–14.16; 386/69–70, 124, 386/111–112; 715/700, 722–723, 835, 741, 715/727, 776; 358/518, 1.9, 1.15, 538; 345/173, 427, 582, 589; 709/224–232, 217–219, 709/204; 359/725, 94, 403; 434/322–323, 434/350–362
See application file for complete search history.

(56) References Cited

U.S. PATENT DOCUMENTS

| 5,539,483 A | 7/1996 | Nalwa ........................ 359/94 |
| 5,613,032 A * | 3/1997 | Cruz et al. ................... 386/69 |
| 5,745,305 A | 4/1998 | Nalwa ........................ 389/725 |
| 5,793,527 A | 8/1998 | Nalwa ........................ 359/225 |
| 5,990,934 A | 11/1999 | Nalwa ........................ 359/403 |
| 6,005,611 A | 12/1999 | Gullichsen et al. ....... 348/211.6 |
| 6,043,837 A | 3/2000 | Driscoll et al. ............... 348/36 |
| 6,111,702 A | 8/2000 | Nalwa ........................ 359/725 |
| 6,115,176 A | 9/2000 | Nalwa ........................ 359/403 |
| 6,128,143 A | 10/2000 | Nalwa ........................ 359/725 |
| 6,141,145 A | 10/2000 | Nalwa ........................ 359/403 |
| 6,144,501 A | 11/2000 | Nalwa ........................ 359/725 |
| 6,175,454 B1 | 1/2001 | Hoogland et al. .......... 359/725 |
| 6,188,831 B1 * | 2/2001 | Ichimura ..................... 386/69 |
| 6,190,178 B1 * | 2/2001 | Oh ............................. 434/323 |

(Continued)

OTHER PUBLICATIONS

Li-wei et al., Why take notes? Use the whiteboard capture system, IEEE ISSN: 1520-6149, pp. 776-779.*

(Continued)

*Primary Examiner*—Ishrat Sherali
(74) *Attorney, Agent, or Firm*—Lyon & Harr, LLP; Katrina A. Lyon

(57) ABSTRACT

A system that captures both whiteboard content and audio signals of a meeting using a digital camera and a microphone. The system can be retrofit to any existing whiteboard. It computes the time stamps of pen strokes on the whiteboard by analyzing the sequence of captured snapshots. It also automatically produces a set of key frames representing all the written content on the whiteboard before each erasure. The whiteboard content serves as a visual index to efficiently browse the audio meeting. The system not only captures the whiteboard content, but also helps the users to view and manage the captured meeting content efficiently and securely.

57 Claims, 19 Drawing Sheets
(8 of 19 Drawing Sheet(s) Filed in Color)

U.S. PATENT DOCUMENTS

| | | | |
|---|---|---|---|
| 6,195,204 B1 | 2/2001 | Nalwa | 359/403 |
| 6,219,089 B1 | 4/2001 | Driscoll et al. | 348/36 |
| 6,219,090 B1 | 4/2001 | Nalwa | 348/36 |
| 6,222,683 B1 | 4/2001 | Hoogland et al. | 359/725 |
| 6,285,365 B1 | 9/2001 | Nalwa | 715/835 |
| 6,313,865 B1 | 11/2001 | Driscoll et al. | 348/36 |
| 6,331,869 B1 | 12/2001 | Furlan et al. | 715/776 |
| 6,337,708 B1 | 1/2002 | Furlan et al. | 348/36 |
| 6,341,044 B1 | 1/2002 | Driscoll et al. | 359/725 |
| 6,346,967 B1 | 2/2002 | Gullichsen et al. | 348/207.99 |
| 6,356,296 B1 | 3/2002 | Driscoll et al. | 345/427 |
| 6,356,397 B1 | 3/2002 | Nalwa | 359/725 |
| 6,369,818 B1 | 4/2002 | Hoffman et al. | 359/725 |
| 6,373,642 B1 | 4/2002 | Wallerstein et al. | 359/725 |
| 6,388,820 B1 | 5/2002 | Wallerstein et al. | 359/725 |
| 6,392,687 B1 | 5/2002 | Driscoll et al. | 348/36 |
| 6,424,377 B1 | 7/2002 | Driscoll et al. | 348/335 |
| 6,426,774 B1 | 7/2002 | Driscoll et al. | 348/335 |
| 6,459,451 B2 | 10/2002 | Driscoll et al. | 348/335 |
| 6,466,254 B1 | 10/2002 | Furlan et al. | 348/36 |
| 6,480,229 B1 | 11/2002 | Driscoll et al. | 348/335 |
| 6,493,032 B1 | 12/2002 | Wallerstein et al. | 348/335 |
| 6,515,696 B1 | 2/2003 | Driscoll et al. | 348/211.89 |
| 6,539,547 B2 | 3/2003 | Driscoll et al. | 725/91 |
| 6,583,815 B1 | 6/2003 | Driscoll et al. | 848/211.5 |
| 6,593,969 B1 | 7/2003 | Driscoll et al. | 348/335 |
| 6,597,520 B2 | 7/2003 | Wallerstein et al. | 359/725 |
| 6,671,732 B1 * | 12/2003 | Weiner | 709/231 |
| 6,700,711 B2 | 3/2004 | Nalwa | 359/725 |
| 6,741,250 B1 | 5/2004 | Furlan et al. | 345/427 |
| 6,756,990 B2 | 6/2004 | Koller | 345/582 |
| 6,806,903 B1 * | 10/2004 | Okisu et al. | 348/254 |
| 6,885,509 B2 | 4/2005 | Wallerstein et al. | 359/725 |
| 6,924,832 B1 | 8/2005 | Shiffer et al. | 348/36 |
| 2001/0035976 A1 * | 11/2001 | Poon | 358/1.15 |
| 2002/0034020 A1 | 3/2002 | Wallerstein et al. | |
| 2002/0063802 A1 | 5/2002 | Gullichsen et al. | |
| 2002/0094132 A1 | 7/2002 | Hoffman et al. | |
| 2002/0154417 A1 | 10/2002 | Wallerstein et al. | |
| 2003/0142402 A1 | 7/2003 | Carbo et al. | |
| 2003/0193606 A1 | 10/2003 | Driscoll et al. | |
| 2003/0193607 A1 | 10/2003 | Driscoll et al. | |
| 2004/0008407 A1 | 1/2004 | Wallerstein et al. | |
| 2004/0008423 A1 | 1/2004 | Driscoll et al. | 359/725 |
| 2004/0021764 A1 | 2/2004 | Driscoll et al. | |
| 2004/0252384 A1 | 12/2004 | Wallerstein et al. | 359/725 |
| 2004/0254982 A1 | 12/2004 | Hoffman et al. | 709/207 |
| 2004/0263636 A1 * | 12/2004 | Cutler et al. | 348/211.12 |
| 2005/0104864 A1 * | 5/2005 | Zhang et al. | 345/173 |

OTHER PUBLICATIONS

Abowd, G.D. Classroom 2000: An experiment with the instrumentation of a living educational environment IBM Systems Journal, Nov. 1999.

Abowd, G.D., C.G. Atkeson, J.A. Brotherton, T. Enqvist, P. Gulley, and J. Lemon. Investigating the capture, integration and access problem of ubiquitous computing in a educational setting. In the Proceedings of CHI '98, pp. 440-447, May 1998.

Brotherton, J.A. and G.D. Abowd. Rooms Take Note: Room Takes Notes! AAA1 Proceedings Template. Graphics, Visualization, and Usability Center. College of Computing, Georgia Institute of Technology. Atlanta, GA.

Brotherton, J.A., G.D. Abowd and K.N. truong. Supporting Capture and Access Interfaces for Informal and Opportunistic Meetings, georgia tEch technical Report, GIT-GVU-99-06. (1998).

Stifelman, L.J. Augmenting Real-World Objects: A Paper-Based Audio Notebook. Porceedings of Chi '96, ACM SIGCHI. Vancouver, Canada.

Stifelman, L.J., B. Arons, C. Schmandt, and E.A. Hulteen. VoiceNotes: A Speech Interfacefor a Hand-Held Voice Notetaker. Porc. INTERCHI '93 (Amsterdam, 1993), ACM.

* cited by examiner

SYSTEM AND METHOD FOR WHITEBOARD AND AUDIO CAPTURE

BACKGROUND

1. Technical Field

This invention is directed toward a system and method for recording meetings. More particularly, this invention is directed towards a system and method for capturing both the whiteboard content and audio of a meeting.

2. Background Art

Meetings constitute a large part of many workers' working time. Making more efficient use of this time spent in meetings translates into a big increase in productivity.

Many meeting scenarios use a whiteboard extensively for brainstorming sessions, lectures, project planning meetings, patent disclosures, and so on. Note-taking and copying what is written on the board often interferes with many participants' active contribution and involvement during these meetings. As a result, some efforts have been undertaken to capture whiteboard content in some automated fashion.

Several technologies have been developed to capture the whiteboard content automatically. One of the earliest, the whiteboard copier, is a special whiteboard with a built-in copier. With a click of a button, the whiteboard content is scanned and printed. Once the whiteboard content is on paper, it can be photocopied, faxed, put away in the file cabinet, or scanned into digital form.

More recent technologies attempt to capture the whiteboard content in digital form from the start. They generally fall into two categories—those that capture images of the whiteboard and those that track pen location and infer whiteboard content therefrom.

The devices in the first category capture images of the whiteboard directly. National Television System Committee (NTSC)-resolution video cameras are often used because of their low cost. Since these cameras usually do not have enough resolution to clearly capture what is written on a typical conference room size whiteboard, several video frames must be stitched together to create a single whiteboard image. Another device in this first category is the digital still camera. As high resolution digital cameras get cheaper, taking snapshots of the board with a digital camera becomes a popular choice.

Devices in the second category track the location of the pen used to write on the whiteboard at high frequency and infer the content of the whiteboard from the history of the pen coordinates. Sometimes they include an add-on device attached to the side of a conventional whiteboard and use special cases for the dry-ink pens and eraser. Each pen emits ultrasonic pulses when pressed against the board. Two receivers at the add-on device use the difference in time-of-arrival of the audio pulses to triangulate the pen coordinates. Since the history of the pen coordinates is captured, the content on the whiteboard at any given moment can be reconstructed later. The user of this type of whiteboard recording can play back the whiteboard content like a movie. Because the content is captured in vector form, it can be transmitted and archived with low bandwidth and small storage requirements.

Electronic whiteboards also use pen tracking technology. They go one step further than the systems using the previously discussed add-on devices by making the whiteboard an interactive device. The user writes on a monitor with a special stylus that is tracked by the computer. The computer renders the strokes on the screen wherever the stylus touches the screen—as if the ink is deposited by the stylus. Because the strokes are computer generated, they can be edited, reflowed, and animated. The user can also issue gesture commands to the computer and show other computer applications on the same screen.

Electronic whiteboards, however, currently still have limited installation base due to their high cost and small sizes (the size of an electronic whiteboard rarely exceeds 6 feet in diagonal). Furthermore, systems with pen-tracking devices have the following disadvantages: 1) If the system is not on or the user writes without using the special pens, the content cannot be recovered by the device; 2) Many people like to use their fingers to correct small mistakes on the whiteboard instead of the special eraser. This common behavior causes extra strokes to appear on the captured content; 3) People have to use special dry-ink pen adapters, which make them much thicker and harder to press, for some of the devices; and 4) Imprecision of pen tracking sometimes causes misregistration of adjacent pen strokes.

Besides the work discussed above with respect to whiteboard capture methods, a great amount of research has been done on the capture, integration, and access of the multimedia experience, especially with respect to lectures and meetings. People have developed techniques and systems that use handwritten notes, whiteboard content, slides, or manual annotations to index the recorded video and audio for easy access.

For example, in a project called the Classroom2000 project, Abowd et al. used an electronic whiteboard to time-stamp the ink strokes so that the viewers (students) could use the ink strokes as the indexes to the recorded video and audio. Key frames (called pages) were computed based on the erasure events provided by the electronic whiteboard. The Classroom2000 project, however, required an electronic whiteboard. With an electronic whiteboard, there are many disadvantages from the end user's point of view. First of all, most offices and meeting rooms do not have electronic whiteboards installed. Secondly, it has been shown that people find it is much more natural to use a regular whiteboard than an electronic whiteboard. Thirdly, images captured with a camera provide much more contextual information such as who was writing and which topic was discussing (usually by hand pointing). In addition to these disadvantages, electronic whiteboards can be costly and are thus not readily available.

SUMMARY

The present invention is directed toward a system and process that overcomes the aforementioned limitations in systems for capturing whiteboard content and associated audio.

The Whiteboard Capture System differentiates from the above systems that capture images of the whiteboard directly in that it computes the time stamps of pen strokes and key frames by performing analysis on the captured images. Key frame images contain all of the important content on the whiteboard and serve as a summary to the recording. They can be cut and pasted to other documents or printed as notes. The time stamps and key frames are effective indices to the recorded audio. Additionally, the Whiteboard Capture System invention employs an ordinary whiteboard, not an electronic whiteboard, like some other whiteboard capture systems. Thus, the system can be used with any existing whiteboard without modification.

The Whiteboard Capture System captures a sequence of images of content written on a non-electronic white board with a camera. It simultaneously records audio signals of the meeting. Once the recording is complete, the image sequence is analyzed to isolate the key frames that summarize the key points of the contents written on the whiteboard. The audio recordings are correlated to the pen strokes on the key frames by time stamps which are associated with both the recorded audio and the image sequence. These time stamps are computed through image analysis.

The general analysis process for obtaining key frames involves rectifying the whiteboard view in every image in the sequence of images. The whiteboard background color is also extracted and each image of the sequence of images is divided into cells. Cell images that are the same over time are clustered together as will be explained in more detail later. Each cell image is then classified as a stroke, a foreground object or whiteboard cell. Key frame images are then extracted using the classification results. Cell images can be spatially and temporally filtered to refine classification results prior to key frame extraction. Additionally, the key frame images, once extracted, can be color balanced to improve image quality.

More specifically, rectifying the whiteboard view involves cropping any non-whiteboard region of each image. The four corners of the whiteboard are then specified in each image. A bi-linear warp is then performed for each image using bi-cubic interpolation to obtain a cropped and rectified whiteboard image in each captured image.

Two methods may be used for extracting whiteboard background color. The first method involves determining the whiteboard cells with the brightest luminance and smallest variance. The color with the brightest luminance and the smallest variance is designated as the whiteboard background color. Once the whiteboard background color is thus determined, any holes in whiteboard color are found and filled by searching the whiteboard cells around each hole. Each hole's color is then set to the color of the nearest cell that is not a hole.

The second method for extracting whiteboard background color involves histogramming the whiteboard image luminance and determining peak whiteboard luminance. The color corresponding to peak luminance is designated as the initial whiteboard color. Any whiteboard color outliers (erroneous data) are then determined using a least-median squares technique. These outliers are marked as holes and are filled in the same manner as in the first method of determining whiteboard color discussed above. The whiteboard color image can be filtered after filling each hole.

The process of dividing each image in the input sequence into cells improve the analysis processing speed. Typically each image is divided into cells such that the cell size is approximately the same size of a single character on the board. This is equivalent to 1.5 inches by 1.5 inches, or 25 pixels by 25 pixels for a typical conference size whiteboard. Alternately, however, all analysis can be performed on a pixel per pixel basis.

Once the sequence of input images are rectified and the whiteboard color has been determined, the cell images are clustered. Cell images that are considered to be the same over time are clustered together in groups. A normalized cross-correlation technique and a Mahalanobis distance test are used to determine if two cells are the same.

The cell-classifying process determines whether a cell image is a whiteboard cell, a stroke or a foreground object. A cell image is designated as a whiteboard cell if the red, green, blue (RGB) values are approximately the same. Alternately, a cell image is designated as a stroke cell if the cell is mostly white or gray with one or two primary colors mixed in. Otherwise, the cell image is designated as a foreground cell. The cell classifying process determines the color distribution of the current cell image and the color distribution of the corresponding whiteboard cell. The cells are then classified based on if the color distribution of the current cell image and the corresponding whiteboard cell are the same, not the same but have a strong similarity, or are totally different.

The above classification procedure only uses the color information in a single cell. More accurate results can be achieved by utilizing spatial and temporal relationship among cell groups. In spatial filtering, two operations are performed on every whiteboard image. First, isolated foreground cells are identified and reclassified as strokes. Second, stroke cells which are immediately connected to some foreground cells are reclassified as foreground cells. With respect to temporal filtering, the basic observation is that it is virtually impossible to write the same stroke in exactly the same position after it is erased. In other words, if for any given cell, the cell images of two different frames contain the same stroke, then all the cell images in between the two frames must have the same stroke unless there is a foreground object blocking the cell. At the temporal filtering step, this cell will be classified as a stroke as long as it is exposed to the camera before and after the foreground object blocks it.

The key frames can then be extracted. To this end, the classification results are used and the stroke cells are counted for each image or frame in the sequence of images. The peaks and valleys of the stroke count are determined. If the difference between each adjacent peak and valley of the stroke count exceeds a prescribed threshold, the data between the valleys are designated as chapters (each chapter signifying a different topic) and the peak within each chapter as the key frame representing the chapter.

The key frame images are then reconstructed. This involves inputting the classified cell images and the key frames divided into cell images. If a key frame cell image is classified as a whiteboard image or a stroke image, its image is rendered as a whiteboard image or a stroke image, respectively. Alternately, if a key frame foreground cell image is within the span of a stroke, this cell image is rendered with the stroke cell image from neighboring images in the sequence. If the key frame cell image is not classified as a whiteboard image, a stroke image or a foreground cell within the span of a stroke, it is rendered as a whiteboard image.

Color balancing can then be used to improve the image quality of the key frame images by making the background uniformly white and increasing the color saturation of pen strokes by using mean whiteboard color to scale the color of each pixel in a cell. Image noise is also reduced.

After the analysis server processes the image sequence and produces the index and key frame images, it sends emails to the registered session participants with the Uniform Resource Locator (URL) (the "address" or location of a Web site or other Internet service) of the processed recording. The users can click on the URL to launch the browsing software. The browser allows users to view the key frame images and quickly access the audio associated with a particular topic.

The User Interface (UI) of the browsing software has various components. The primary elements of the browser UI include a key frame pane where key frame thumbnails are displayed, and the main display pane of the browser that shows a composition of the raw image from the camera and the current key frame image.

The key frame pane also incorporates a background transparency slider that allows the user to adjust the image displayed in the main display pane from the raw input image to the key frame image. Current pen strokes, strokes that have already been written in the meeting playback timeline, are rendered darker and more clearly than future strokes. The pen-strokes that the participants are going to write in the future are shown in a ghost-like style. This visualization technique is realized using the following process. The current whiteboard content is rendered using the key frame image of the current chapter and time stamp information. Then future strokes are rendered, converted to gray scale and blurred using a Gaussian filter. These two images are then added, and the resultant image is alpha-blended with the rectified image from the input sequence. The user can control the alpha value with the GUI slider from 0, showing only the rendered keyframe whiteboard image, to 1, showing exactly the original image.

A VCR and standard timeline control is provided in the lower left corner of the browser UI, below the main display pane. The VCR and standard timeline control allow the user to sequence backwards or forwards slowly or quickly in the image/audio sequence or to stop, much like the controls found on a typical video cassette recorder (VCR). A timeline bar graphically displays the length of the audio/image sequence as a bar, and provides numerical values of the start time, end time and current time of the meeting playback. A pointer on this bar can be selected and dragged forward and backward along the timeline bar to linearly sequence forwards and backwards in the image/audio sequence.

Two levels of non-linear access to the recorded audio are provided in the context of visual indexing. The first level of non-linear access is through the use of key frame thumbnails. The user can click a key frame thumbnail to jump to the starting point of the audio (e.g., beginning of the chapter) for the corresponding key frame. Each key frame has a time range associated with it that assists the user in determining the time range associated with that particular key frame. The second level of non-linear access to the recorded audio is through the use of the pen strokes in each key frame. When the cursor is hovering over a pen stroke cell (current stroke cell or future stroke cell) in the main window, the cursor is changed to a "hand" symbol indicating that it is selectable (e.g., "clickable" with a mouse). Double clicking on the cell with a mouse or other input device brings the application to the audio playback mode. The playback starts from the time of the session when the clicked stroke cell was written. The user can still click other stroke cells to jump to other part of the session. Together with the VCR and standard time line control 1514, these two levels of visual indexing allow the user to browse a meeting in a very efficient way.

As stated previously, the thumbnails of the key frame images are listed in the key frame pane. Selecting one of the thumbnails brings the corresponding key frame image to the main window at the left and takes the application to the image viewing mode, where the user can zoom in and out using the zoom control buttons, read the text and diagrams in the image, or cut and paste a portion of the image to other documents. Additionally, the entire key frame can be cut and pasted to other documents or printed as notes.

In the Whiteboard Capture System, meeting participants are asked to register with the capture software at beginning of the meeting recording. All the recorded sessions reside on a web server. If no one registers, the meeting is posted on a publicly accessible web page. If at least one participant registers, an access token is generated after the meeting recording and analysis. The token is a long randomly generated string containing a unique meeting identifier. The URL containing the token is emailed to the registered participants. The recipients go to the URL to launch the web browsing software to review the meeting. They can also forward the URL to people who have not attended the meeting.

The above-described basic Whiteboard Capture System can be combined with many other techniques and devices to render alternate embodiments. In one such embodiment, conventional Optical Character Recognition (OCR) is performed on the key frames to provide editable text that is easily used to create documents or presentation viewgraphs.

In another embodiment, conventional voice recognition software is used to convert the audio portion of the captured data to text. This allows the easy creation of meeting minutes and other documents. It also provides a relatively inexpensive way to provide meeting information to the hearing impaired.

The Whiteboard Capture System can also be made portable using, for example, a notebook computer with a microphone and a camera mounted on a tripod. This configuration only requires an additional initial calibration to determine the location of the camera relative to the whiteboard. This calibration could be performed manually by manually determining the four corners of the panel in the image, or automatically, by using such methods as edge detection.

The analysis software of the Whiteboard Capture System can also be used to determine key frames with the whiteboard capture systems that use pen tracking to infer whiteboard content. Using the Whiteboard Capture System analysis software with such a system simplifies the analysis process. There is no determination of whiteboard background color or whiteboard region rectification necessary, no spatial and temporal filtering required, and the classification of whiteboard cells is simpler because cell images will either be stroke or whiteboard, since no foreground object will interfere with the text written on the whiteboard.

Additionally, to achieve higher frame rate, a high resolution video camera such as a HDTV camera can be used instead of a still camera.

In yet another embodiment, the Whiteboard Capture System incorporates gesture recognition to use gesture commands. For instance, a command box can be written somewhere on whiteboard. When the user motions or point to the box the system uses gesture recognition to time stamp the images at the particular time the gesture was made.

The white board capture system relieves meeting participants of the mundane note-taking task, so they can focus on contributing and absorbing ideas during meetings. By providing key frame images that summarize the whiteboard content and structured visual indexing to the audio, the system helps the participants to review the meeting at a later time. Furthermore, people who did not attend the meeting can often understand the gist of the meeting in a fraction of the time.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
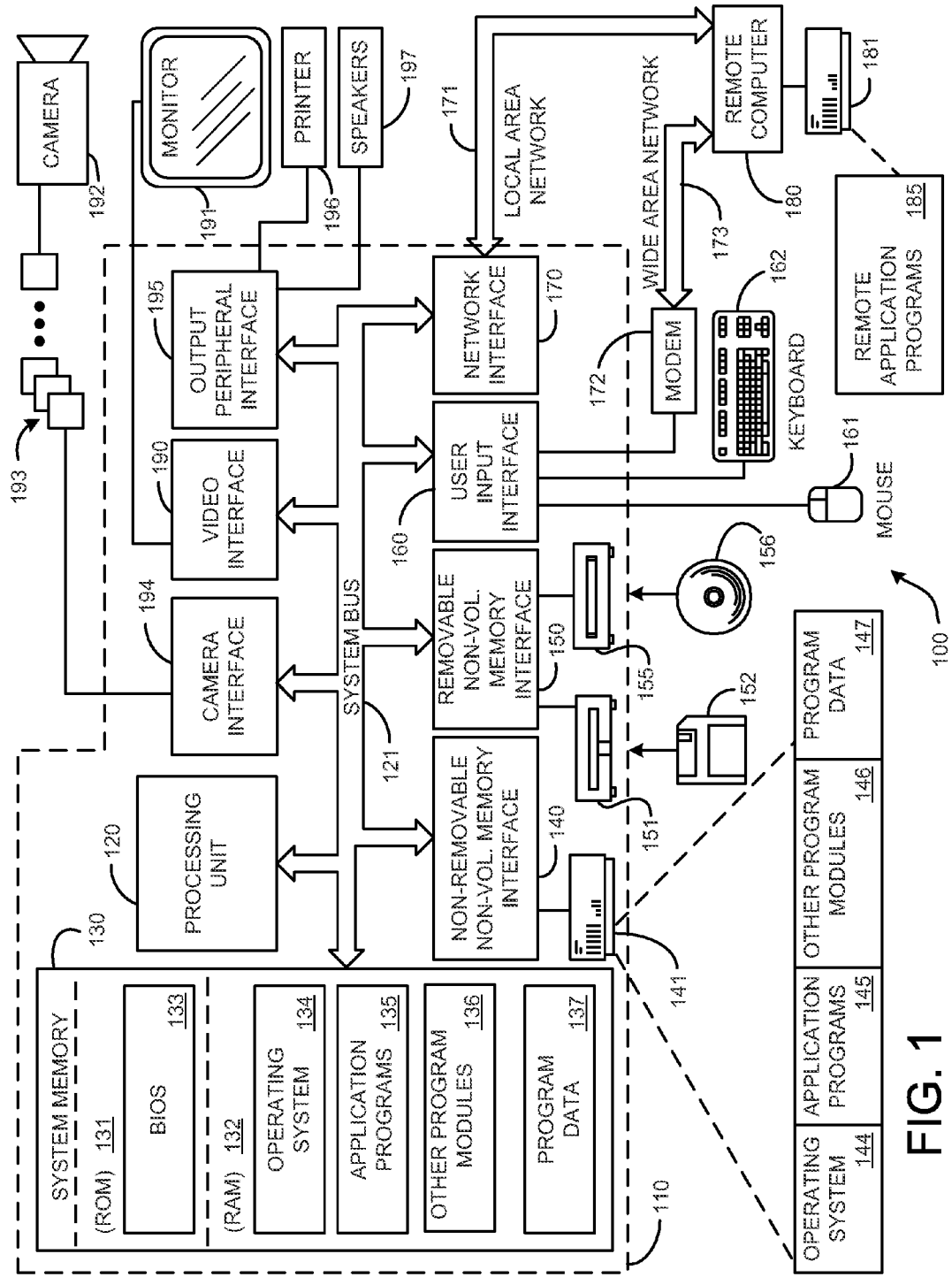
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Whiteboard Capture System and Method.

2.1 System Architecture.

Figure 2:
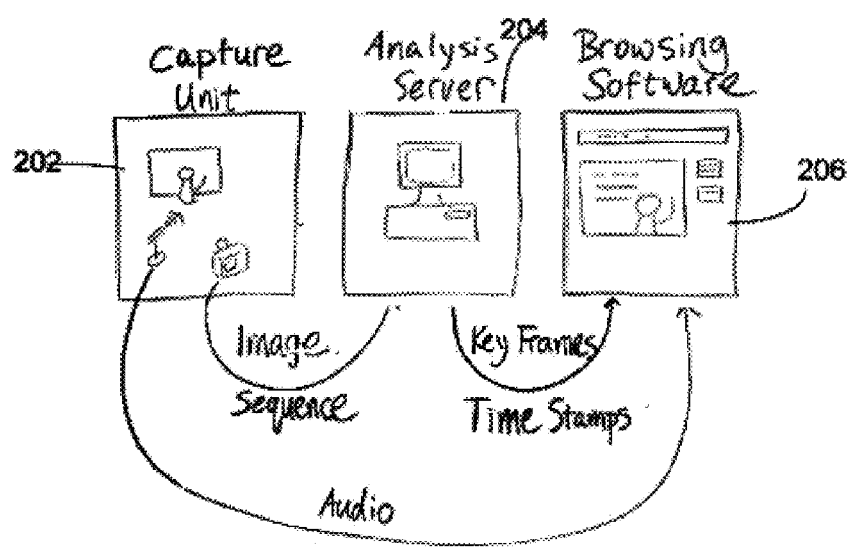
FIG. 2 is a diagram depicting three main components of the white board capture system—the capture unit, analysis server and the browsing software. This diagram was captured using a prototype whiteboard capture system.

Conceptually, the Whiteboard Capture System consists of three primary components: a capture unit 202, an analysis/processing server 204, and browsing software 206, as shown in FIG. 2.

Figure 3:
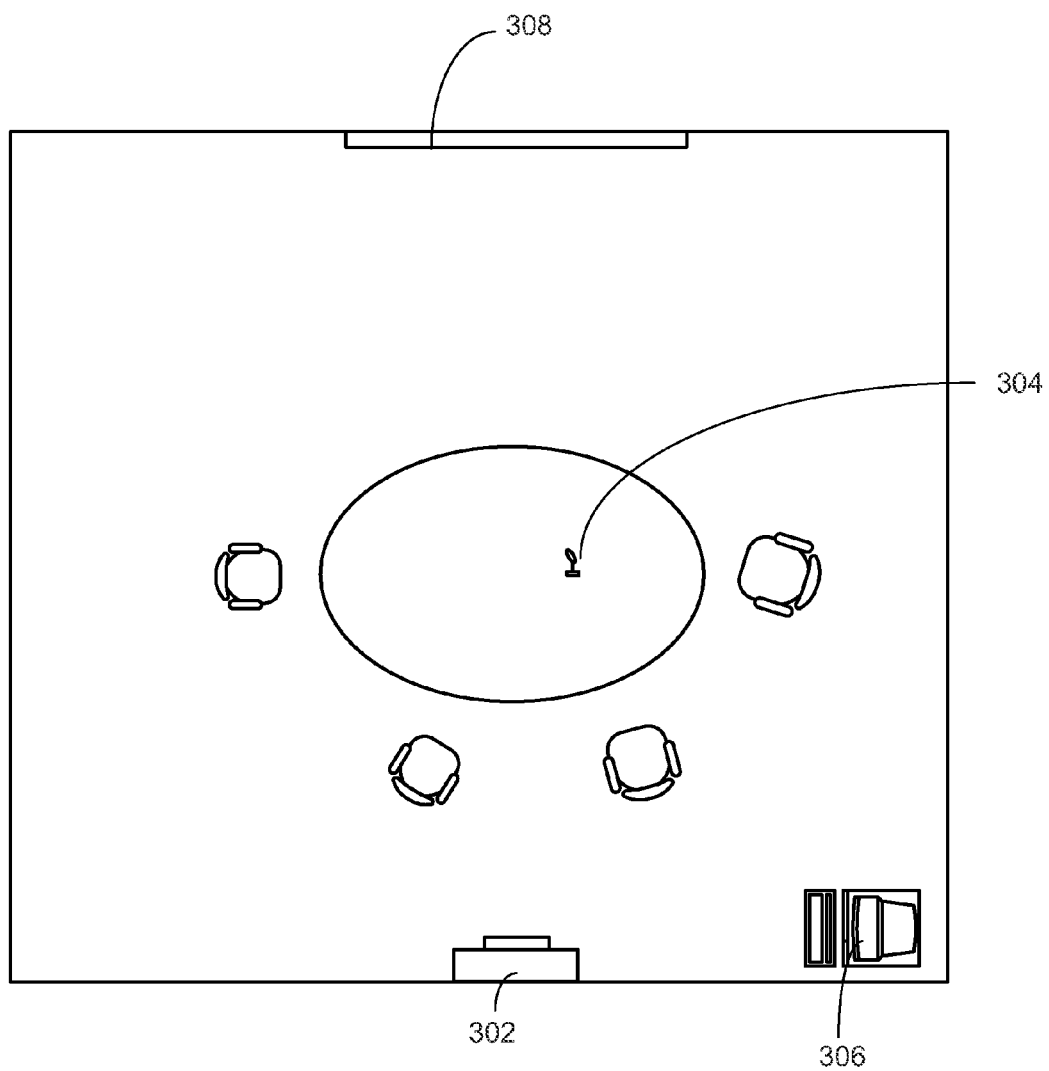
FIG. 3 is a schematic of a white board capture system according to the present invention.

1. Capture unit: The capture unit is used to capture images of the whiteboard content and to record the audio associated with the creation of the whiteboard content. The capture unit is installed in a room where meetings take place. As shown in FIG. 3, it includes a digital camera 302, a microphone 304, and a personal computer (PC) 306. The capture unit takes images of the whiteboard 308 and records audio via the microphone 304 that is stored to the PC 306. Both the images taken and the audio are time stamped. The images and the audio samples are obtained at a common clock, usually the system clock. The timing of the common clock is associated with the images and audio samples and is stored as their time stamps.

2. Analysis server: The analysis server 204 is located in a central place and analyzes and stores the recorded image data. In one embodiment, an analysis program is launched automatically after the user stops the recording in the capture unit. After processing the recorded data, emails containing the URL where the meeting recording is available are sent to the registered participants. If there are no registered users the meeting recording can be posted to a publicly-accessible web-site.

3. Browsing software: The browsing software 206 allows the user to view and play back the recorded and analyzed meeting data. The browsing software 206 is preferably provided as a web plug-in to be installed by the users who wish to view the meeting recordings. Once installed, the users can click the aforementioned URL to launch the software to access the data on the analysis server.

2.2 Image Acquisition

Figure 4:
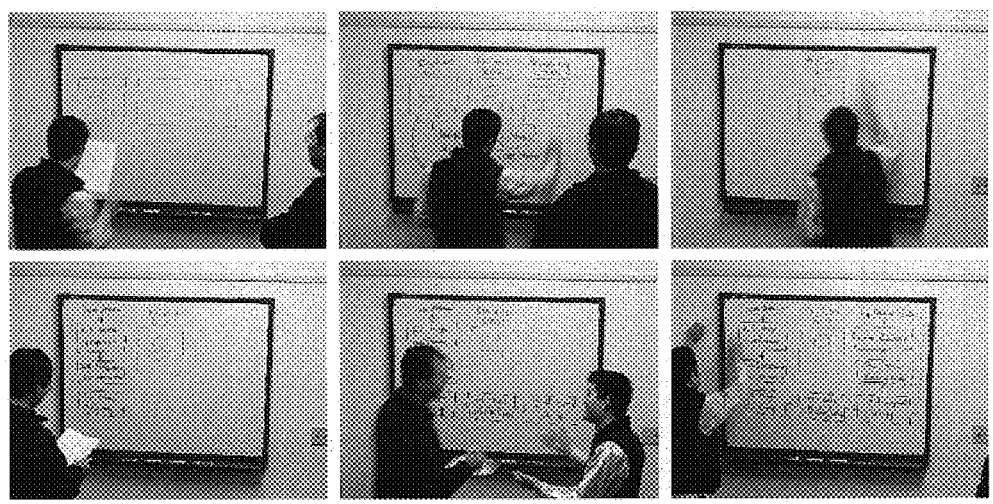
FIG. 4 is a series of images showing selected frames from an input image sequence.

The input to the Whiteboard Capture System is a set of still digital images. FIG. 4 shows an exemplary set of such images. The image sequence is analyzed to determine when and where the users wrote on the board and to distill a set of key frame images that summarize the whiteboard content throughout a session.

Any relatively high resolution camera that allows camera control by a computer can be used for image acquisition. The camera is preferably mounted at either the side or the back of a meeting room. The camera is zoomed in as close to the whiteboard as possible to maximize the effective resolution. The camera is stationary after the installation and the assumption is made that the whiteboard does not move, so the whiteboard images are stationary throughout the captured sequence.

If a camera that is used has only auto focus mode, the whiteboard might become out-of-focus if an object in front of the whiteboard triggers the attention of the auto focus mechanism of the camera. This problem can be mitigated by aligning the image plane of the camera as parallel to the whiteboard as possible to minimize scene depth and/or minimizing the aperture to increase the depth of field. In practice, only 1–2% of the frames were observed to be out-of-focus in a working embodiment of the Whiteboard Capture System.

The camera takes the pictures as fast as it can and transfers the images to the PC, preferably via a USB connection. One JPEG image was obtained about every 5 seconds in a working embodiment of the Whiteboard Capture System. The exposure and white-balance parameters are typically kept constant. Assuming the light setting does not change within one session, the color of whiteboard background should stay constant in a sequence.

It was found that slightly under exposed images give better color saturation, which makes the stroke extraction process to be discussed later more accurate. A color-balancing step can be performed after recording to make the grayish whiteboard images more appealing.

2.3 Image Sequence Analysis

Since a person who is writing on the board is in the line of sight between the digital camera and the whiteboard, he/she often obscures some part of the whiteboard and casts shadow on the other parts. It is necessary to distinguish among strokes, the foreground object (e.g., person writing on the board), and the whiteboard. Once the classification results are known, the key frame images and an index can be used by the browsing software.

Figure 5:
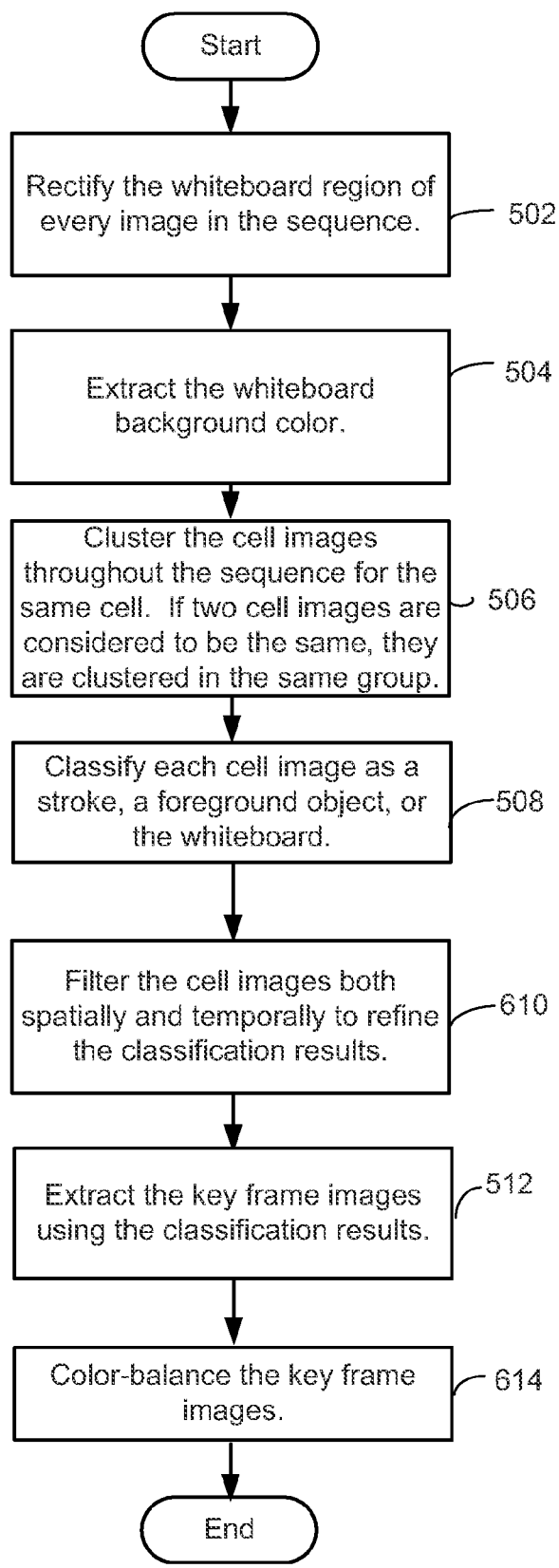
FIG. 5 is a flow chart depicting the image analysis process of the system and method according to the invention.

Rather than analyzing the images on a per-pixel level (although this could be done) the whiteboard region is divided into rectangular cells to lower the computational cost. The cell size is chosen to be roughly the same as the expected size of a single character on the board (about 1.5 by 1.5 inches, or 25 by 25 pixels, in a working embodiment). Since the cell grid divides each frame in the input sequence into cell images, the input can be thought of as a three dimensional matrix of cell images (e.g., x, y, time). The division of each image into cells is typically performed after the input images have been rectified. As shown in FIG. 5 and below, the general process actions of the procedure to analyze the input image sequence are as follows:

1. Rectify the whiteboard region of every image in the sequence (process action 502).
2. Extract the whiteboard background color (process action 504).
3. Cluster the cell images throughout the sequence for the same cell, after dividing every image in the sequence into corresponding cell images (process action 506). If two cell images are considered to be the same over time, they are clustered in the same group.
4. Classify each cell image as a stroke, a foreground object, or the whiteboard (process action 508).
5. Filter the cell images both spatially and temporally to refine the classification results (process action 510).
6. Extract the key frame images using the classification results (process action 512).
7. Color-balance the key frame images (process action 514).

In the following paragraphs, the running example as shown in FIG. 4 is used to illustrate the input image sequence analysis procedure.

2.3.1 Rectify the Whiteboard Images

Before feeding the image sequence to the stroke extraction process, the non-whiteboard region is cropped and the images are rectified. Because the lens of the camera used in the working embodiment has fairly low radial distortion, it is only necessary to identify the four corners of the whiteboard (otherwise it might be necessary to correct for radial distortion via conventional methods prior to rectifying the images). This is done manually by clicking on the location of the four corners of the whiteboard in a captured image during a one-time calibration step, although this could be done automatically (e.g., by using edge detection). With the four corners, a simple conventional bi-linear warp is performed for each image in the sequence using bi-cubic interpolation to obtain a cropped and rectified whiteboard view in each captured image.

2.3.2 Computing the Whiteboard Color

For the classification of the cells, it is necessary to know what the whiteboard color is (that is, the color of the whiteboard itself without anything written on it) for each cell. The whiteboard color is also used for white-balancing in producing the key frames, so it should be estimated accurately to ensure the high quality of the key frame images.

Figure 6A:
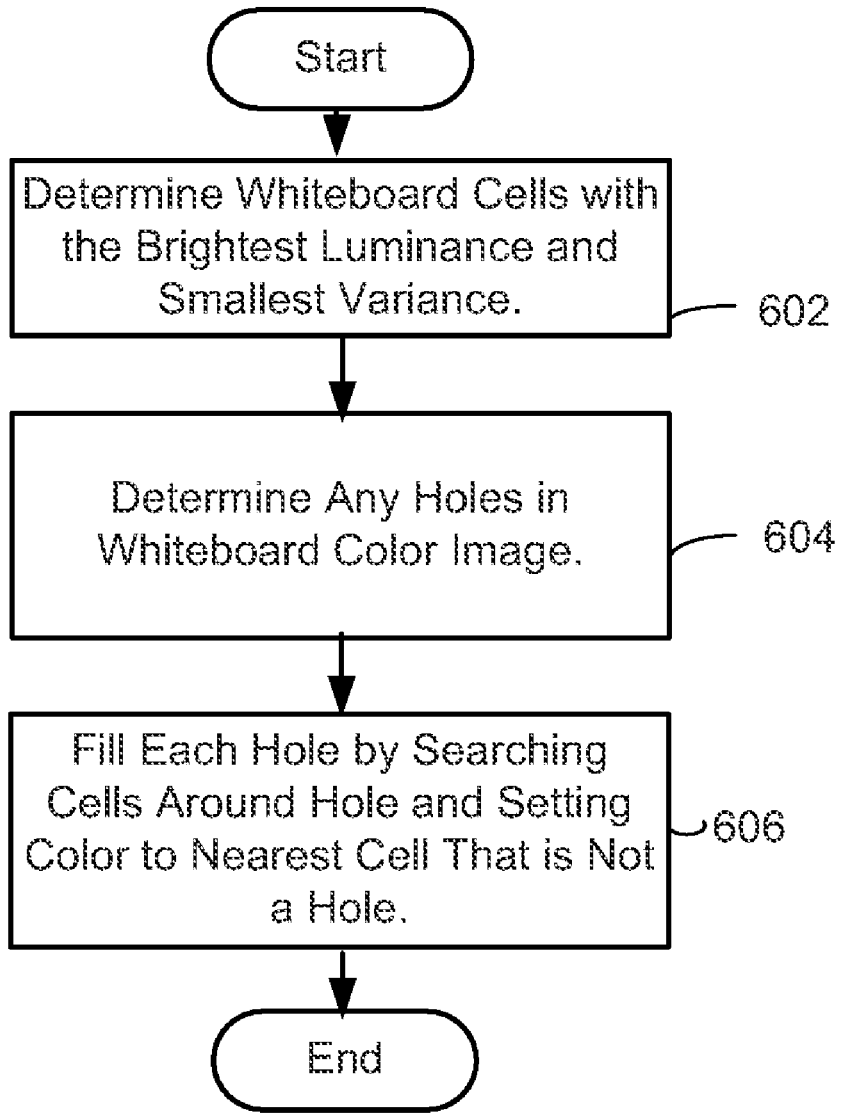
FIG. 6A is a first technique of computing whiteboard color.
Figure 7:
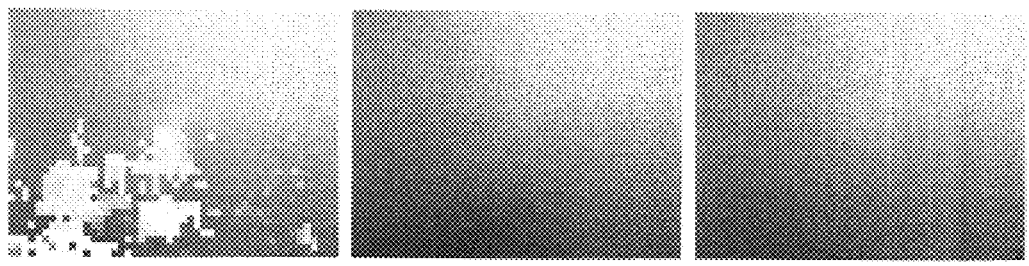
FIG. 7 is a series of images showing whiteboard color extraction results. The left image is the result of the first strategy of computing whiteboard color, the middle image is the result of the second strategy of computing whiteboard color, and the right image shows the actual blank whiteboard image.

Two strategies have been used for computing whiteboard color. The first strategy, outlined in FIG. 6A, is based on the assumption that the whiteboard cells have the brightest luminance over time and have small variance (i.e., almost uniform within each cell). This is reasonable since the color of the strokes (red, green, blue or black) will lower the luminance. As shown in process action 602, the whiteboard cells with the brightest luminance and smallest variance are computed. This, however, may produce holes in the final whiteboard color image. For example, if a cell either contains a stroke or is blocked by a foreground object throughout the sequence, the whiteboard color computed for this cell will not be correct (this cell appears different from the rest of whiteboard, and thus looks like a hole). To this end, as shown in process action 604, any holes in the whiteboard color image are detected by using a technique called least-median-squares (similar to the outlier detection method as described in the next paragraph). The holes are then filled. (process action 606). To fill a hole, its neighborhood is searched, and the whiteboard color is set to that of the nearest cell that is not a hole. This strategy usually works quite well, but it fails when a person wears a white T-shirt and/or holds a piece of white paper. The left image of FIG. 7 shows the result of the whiteboard color image computed from the input sequence in FIG. 4, where a person was holding a white paper in some of the frames. It can be seen that the computed whiteboard color is corrupted by the white paper.

Figure 6B:
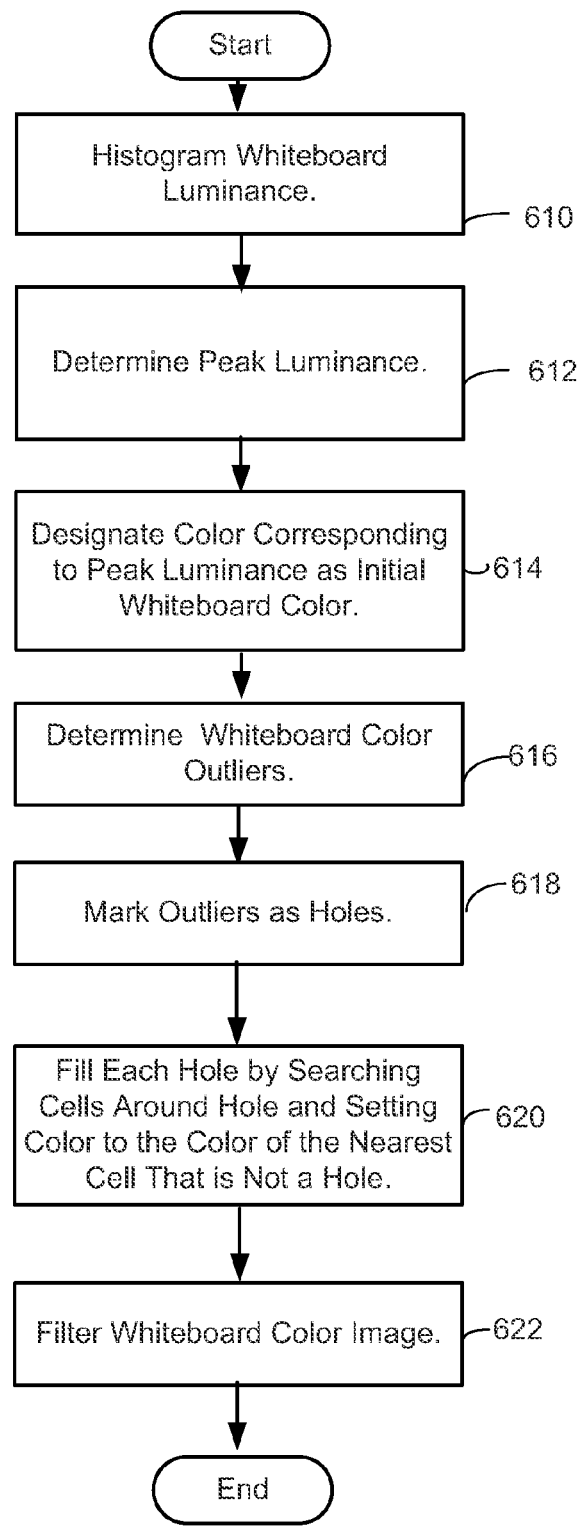
FIG. 6B is a second technique of computing whiteboard color.

The second strategy of determining whiteboard color is shown in FIG. 6B and is more sophisticated. The assumption is that a significant portion of the pixels in each cell over time belongs to the whiteboard. By building a histogram of the luminance for each cell, the color corresponding to the peak with a high luminance value is very likely the color of the whiteboard for this cell. The first step is therefore to build a histogram for each cell and compute peak luminance (process actions 610 through 614) to compute an initial whiteboard color in this way. This technique works even if a cell contains a stroke throughout the sequence, but it fails in the case when a person wears a white T-shirt and/or holds a piece of white paper, or when a cell is always hidden by people or other objects. In such cases, the computed whiteboard color image contains outliers. The next action is to detect any outliers (process action 616). The outlier detection is based on a robust technique called least-median-squares. Assuming the color varies smoothly across the whiteboard, a plane is fit in the luminance Y or RGB space by minimizing the median of the squared errors. The cells whose color does not follow this model are considered to be outliers and consequently rejected, i.e., they are marked as holes (process action 618). The interested reader is referred to the Appendix for the details of this technique. Next, as shown in process action 620, the holes are filled by using the same procedure as in the first whiteboard color computing strategy (process action 620). Finally, to further improve the result, the whiteboard color image may be filtered by locally fitting a plane in the RGB space (process action 622). The interested reader is again referred to the Appendix for details. The result obtained with this new technique on the same example is shown in the middle image of FIG. 7. Clear improvements are seen over the result obtained with the first strategy as shown in the left. The actual blank whiteboard is also shown in the right image for comparison.

2.3.3 Clustering Cell Images Over Time

During the meeting, the content of each cell usually changes over time. For each cell, one would like to cluster all the cell images in the time sequence into groups, where each group contains the cell images that are considered to be the same over time. A modified Normalized Cross-Correlation algorithm is used to determine if two cell images are the same or not. In the following, the Normalized Cross-Correlation technique is described using one color component of the image, but it applies to all RGB components.

Consider two cell images I and I'. Let $\bar{I}$ and $\bar{I}'$ be their mean colors and $\sigma$ and $\sigma'$ be their standard deviations. The normalized cross-correlation score is given by $$c = \frac{1}{N\sigma\sigma'} \sum_i (I_i - \bar{I})(I'_i - \bar{I}')$$

where the summation is over every pixel i and N is the total number of pixels. The score ranges from −1, for two images not similar at all, to 1, for two identical images. Since this score is computed after the subtraction of the mean color, it may still give a high value even if two images have very different mean colors. So an additional test is used on the mean color difference based on the Mahalanobis distance, which is given by $d=|\bar{I}-\bar{I}'|/(\sigma+\sigma')$. In summary, two cell images I and I' are considered to be identical and thus should be put into the same group if and only if $d<T_d$ and $c>T_c$. In a working implementation of the Whiteboard Capture System, $T_d=2$ and $T_c=0.707$ were successfully used.

2.3.4 Classifying Cells

The cell-classifying process action determines whether a cell image is a whiteboard, a stroke, or a foreground object. The following heuristics are used: 1) a whiteboard cell is uniform in color and is grey or white (i.e., the RGB values are approximately the same); 2) a stroke cell is mostly white or grey with one or two primary colors mixed in; 3) a foreground object does not have the characteristics above. The classification therefore determines whether the color distribution of the current cell image and the whiteboard color distribution are the same, or not the same but having strong overlap, or totally different. Again, the Mahalanobis distance is used as described below.

Notice that the whiteboard color has already been computed as described previously. Again, one color component of RGB is used as an example. Let $\bar{I}_w$ be the whiteboard color and $\sigma_w$ be the standard deviation (it is a small value since a whiteboard cell is approximately uniform). Let $\bar{I}$ and $\sigma$ be the mean and standard deviation of the current cell image. The cell image is classified as a whiteboard cell if and only if $|\bar{I}-\bar{I}_w|/(\sigma+\sigma_w)<T_w$ and $\sigma/\sigma_w<T_\sigma$; as a stroke cell if and only if $|\bar{I}-\bar{I}_w|/(\sigma+\sigma_w)\leq T_w$ and $\sigma/\sigma_w\geq T_\sigma$; otherwise, it is classified as a foreground object cell. In a working embodiment of the Whiteboard Capture System, $T_w=2$ and $T_\sigma=2$ were successfully used.

2.3.5 Filtering Cell Classification

The above classification procedure only uses the color information in a single cell. More accurate results can be achieved by utilizing spatial and temporal relationship among the cell groups.

Figure 8:
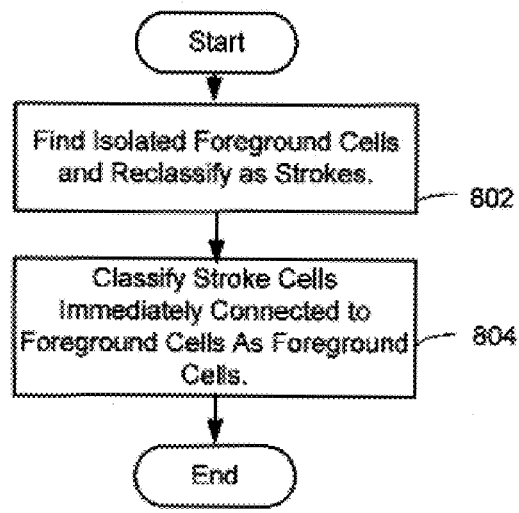
FIG. 8 is a flow chart depicting the cell classification process of the system and method according to the present invention.

2.3.5.1 Spatial filtering. With respect to spatial filtering, the basic observation is that foreground cells should not appear isolated spatially since a person usually blocks a continuous region of the whiteboard. In spatial filtering, two operations are performed on every single whiteboard image, as shown in FIG. 8. First, isolated foreground cells are identified and reclassified as strokes (process action 802). Second, stroke cells which are immediately connected to some foreground cells are reclassified as foreground cells (process action 804). One main purpose of the second operation is to handle the cells at the boundaries of the foreground object. If such a cell contains strokes, the second operation will incorrectly classify this cell as a foreground object. Fortunately, however, the following temporal filtering corrects such potential errors.

2.3.5.2 Temporal filtering. With respect to temporal filtering, the basic observation is that it is virtually impossible to write the same stroke in exactly the same position after it is erased. In other words, if for any given cell, the cell images of two different frames contain the same stroke, then all the cell images in between the two frames must have the same stroke unless there is a foreground object blocking the cell. This observation is very useful to segment out the foreground objects. Consider the example in the previous section where a stroke cell at the boundary of the foreground object is incorrectly classified as a foreground cell. At the temporal filtering step, this cell will be classified as a stroke as long as it is exposed to the camera before and after the foreground object blocks it.

Figure 9:
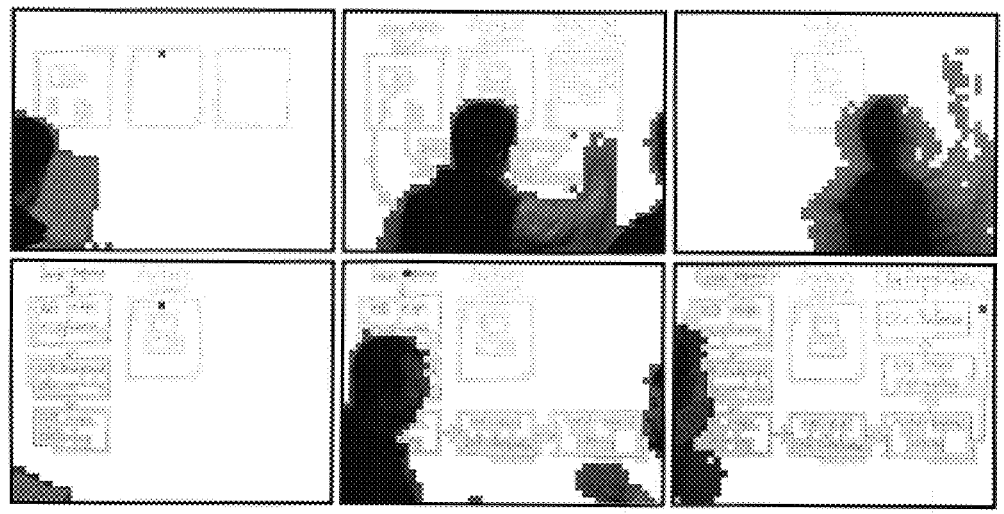
FIG. 9 is a series of samples of the classification results. The images above correspond to the images in FIG. 5 after cropping and rectification.

FIG. 9 shows the classification results for the sample images in FIG. 4, where the strokes are in green, the foreground is in black, and the whiteboard is in white.

2.3.6 Key Frame Image Extraction

Key frame images contain all the important content on the whiteboard and serve as a summary to the recording. The user should expect the key frame images to have the following properties: 1) They should capture all the important content on the board; 2) The number of the key frames should be kept to a minimum; 3) They should only contain the pen strokes and the whiteboard, but not the person in front; 4) They should have uniform white background and saturated pen colors for easy cut-and-paste and printing.

The key frame extraction procedure uses the cell images classification results from the process actions previously described. The procedure first decides which frames in the sequence should be selected as key frames; it then reconstructs the key frame images. This is described in detail below.

Figure 10:
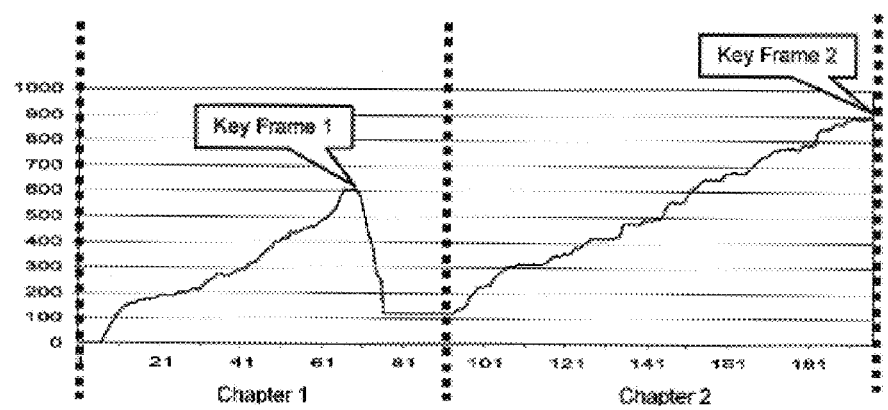
FIG. 10 is a plot of the number of strokes vs. time for the sequence in FIG. 4.
Figure 11:
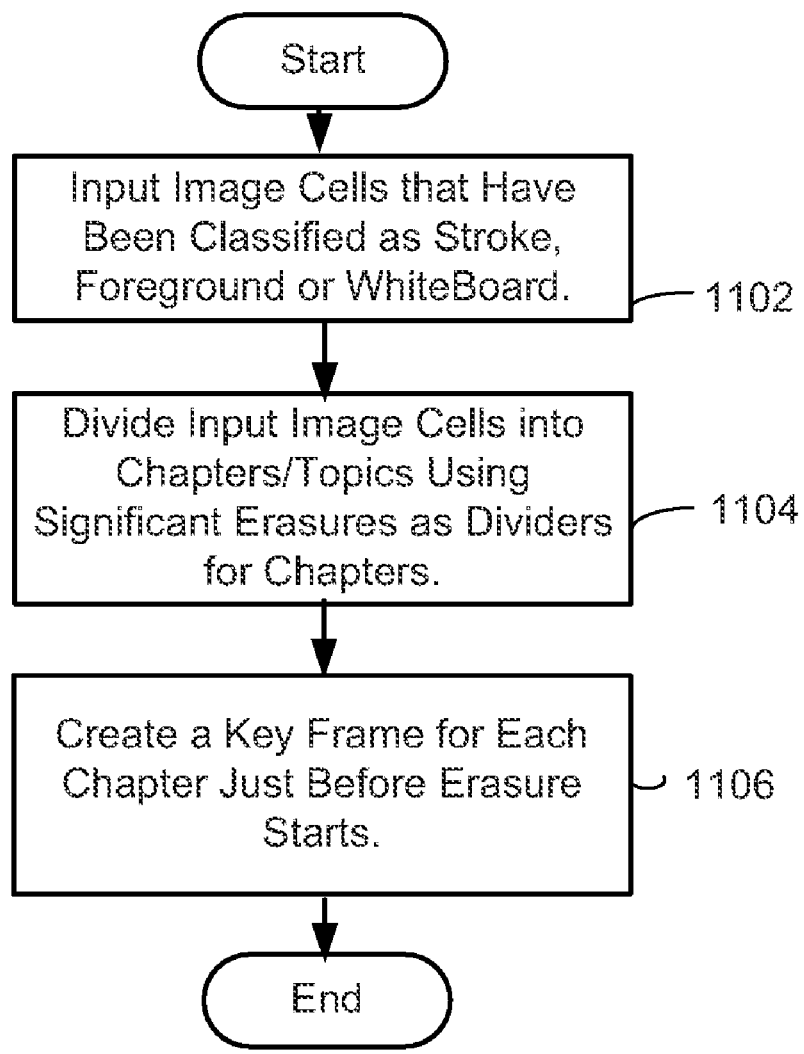
FIG. 11 is a flowchart depicting the general process used to select key frames from a sequence of input images.
Figure 12:
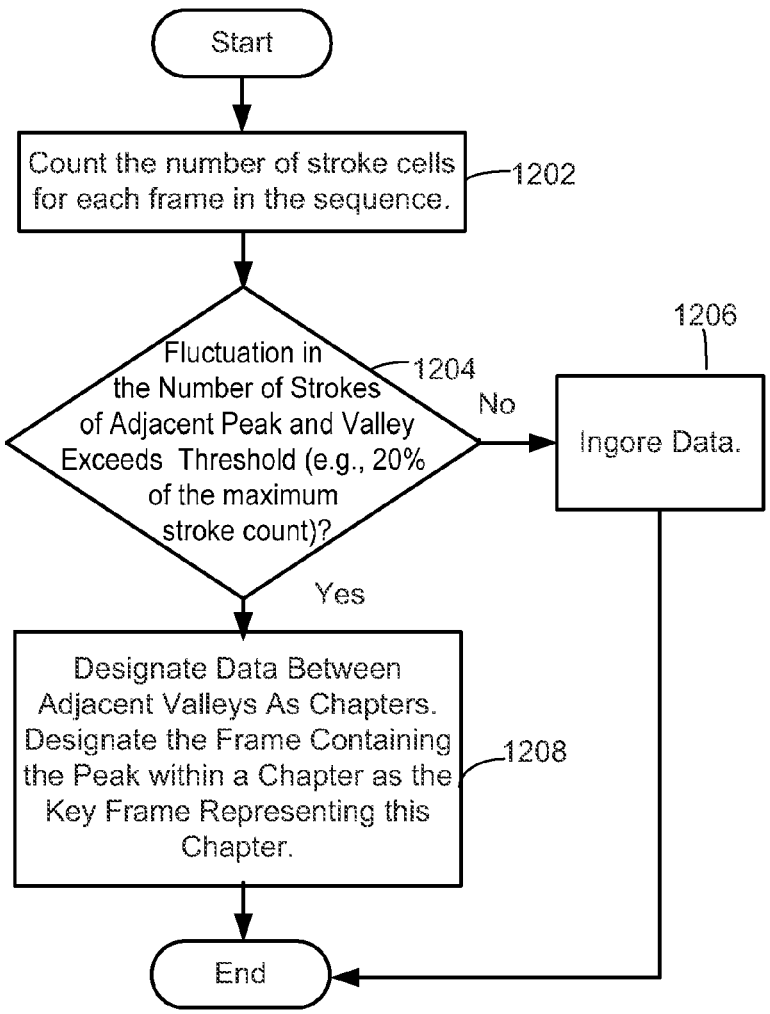
FIG. 12 is a flow chart depicting the process of identifying chapters and key frames in the system and method according to the present invention.

2.3.6.1 Key Frame Selection. There is no unique solution in selecting the key frames—just as there is no single way to summarize a meeting. In the most general sense, referring to FIG. 11, the input image cells that have been classified as stroke, foreground or whiteboard are used (process action 1102). The meeting is first divided into several chapters (topics) (process action 1104). An erasure of a significant portion of the board content usually indicates a change of topic so it is used as a divider of the chapters. Then a key frame image representative of the whiteboard content is created for that chapter (process action 1106). The frame just before a significant erasure starts is chosen as the key frame, which ensures that the content is preserved in these frames. The detailed procedure, shown in FIG. 12, works as follows:

1. The number of stroke cells for each frame in the sequence are counted (process action 1202). One stroke cell image may span multiple frames—it is included in the count for each of those frames. FIG. 10 shows the stroke cell count plotted against frame number in the example session (FIG. 4). A rise in the plot indicates more strokes are written on the board, where a dip in the plot indicates some strokes are erased. The graph is quite noisy. There are two reasons: 1) The user is constantly making small adjustments on the board; 2) The classification results contain small errors.
2. Using the stroke count for the various frames the peaks and valleys are determined (process action 1204). If a key frame is produced at each dip, dozens of key frames will result. In order to keep the number of key frames to a minimum, the data is filtered to retain only the significant erasure events. The procedure ignores the fluctuation in the data unless the difference between the adjacent peak and valley exceeds a certain threshold (process action 1206). Twenty percent of the maximum stroke count was successfully used in a working embodiment of the system.
3. The valleys in the data are then used to divide the session into chapters (process action 1208). The frame containing the peak within a chapter is chosen to be the key frame representing the chapter.

Figure 13:
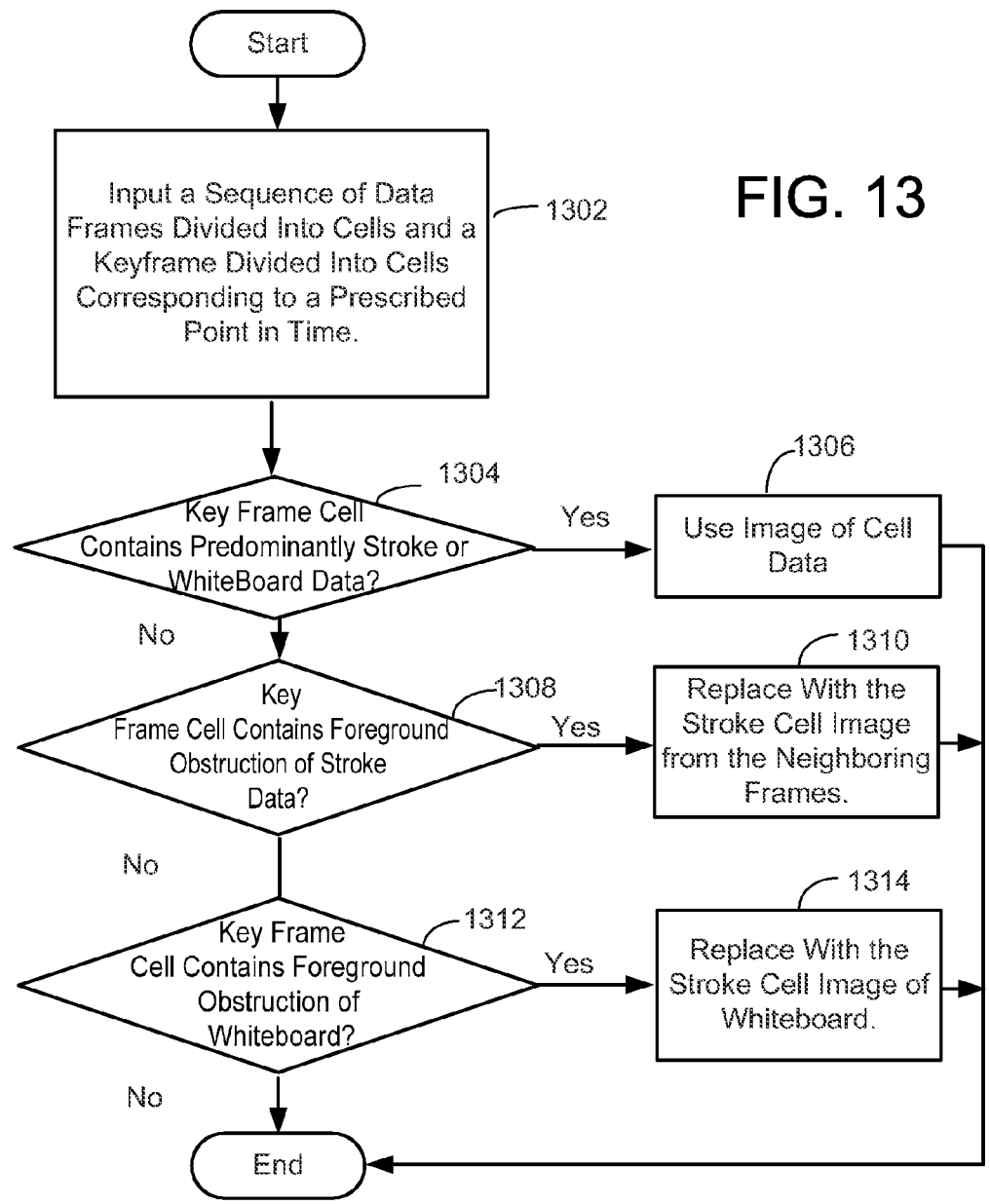
FIG. 13 is a flow chart depicting the process of reconstructing key frame images in the system and method according to the present invention.
Figure 14:
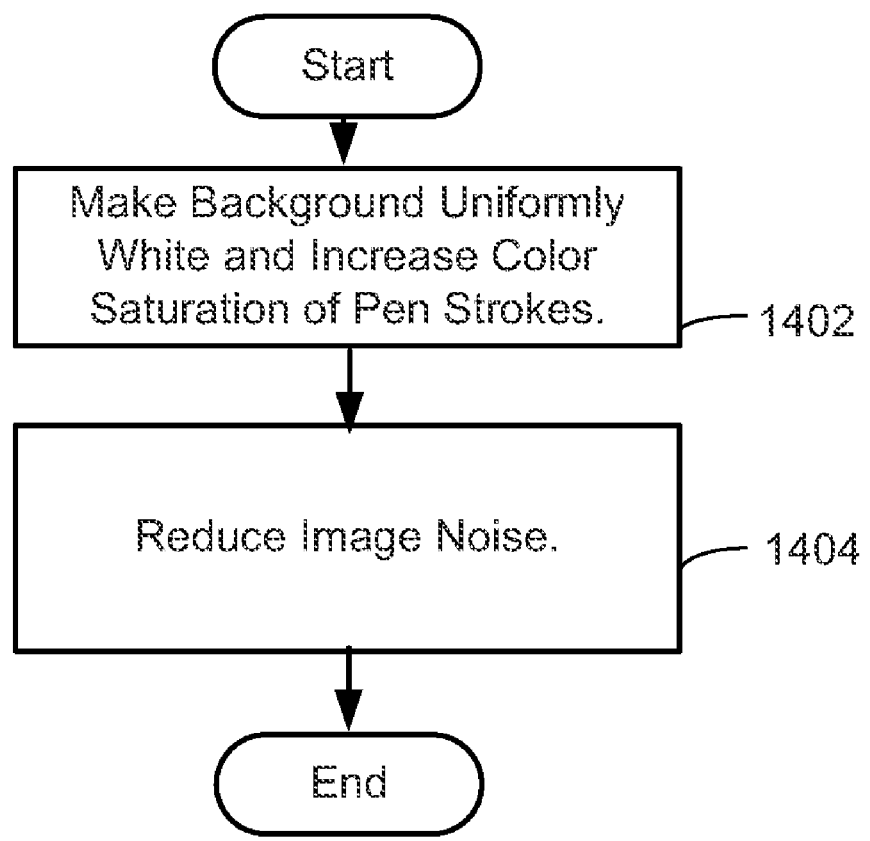
FIG. 14 is a flow chart depicting the process of color balancing the key frame images in the system and method according to the present invention.

2.3.6.2 Image Reconstruction. Once the frames are selected, it is necessary to reconstruct the images corresponding to what the whiteboard looked like at these points in time. However, one cannot simply use the raw images from the input sequence because they may contain foreground objects. The image is reconstructed by gathering the cell images in the frame. Referring to FIG. 13, the frames divided into cell images and the key frame divided into cell images are input (process action 1302). There are three cases depending on the cell classification:

1. If a key frame cell image is whiteboard or stroke, its own image is used (process actions 1304, 1306).
2. If the key frame foreground cell image is within the span of a stroke (i.e., the person is obscuring the strokes on the board. This is determined through temporal filtering during the analysis phase), this cell image is replaced with the stroke cell image from the neighboring frames (process action 1308, 1310).
3. Otherwise, as shown in process actions 1312 and 1314, a foreground object must be covering the whiteboard background in this cell, and is filled in whiteboard color computed as discussed previously.

2.3.7 Key Frame Color Balance

The reconstruction process removes the person from the whiteboard images, but the images still look like the raw images from the input sequence: grayish and noisy. They can be color balanced to produce a better image. The process consists of two steps:

1. Make the background uniformly white and increase color saturation of the pen strokes. For each cell, the whiteboard color computed as discussed previously, $\bar{I}_w$, is used to scale the color of each pixel in the cell.

$$I_{out} = \min\left(255, \frac{I_m}{\bar{I}_w} \cdot 255\right)$$

(process action 1402).

2. Reduce image noise. The value of each color channel of each pixel in the key frames is remapped according to an S-shaped curve (process action 1404). Intensities less than 255/2 are scaled down toward 0 while the intensities larger than 255/2 are scaled up toward 255.

The beginning and ending times of the chapters and the file names of their key frame images are saved in the index along with the time stamps of the strokes. The time stamp of a stroke is the first frame that this stroke appears. This information has been computed in Section 2.3.3.

2.4 Browser Operation and User Interface 2.4.1 Overview.

After the analysis server processes the image sequence and produces the index and key frame images, it sends emails to the registered session participants with the URL to the processed recording. The users can click the URL to launch the browsing software. The goal of the browsing software is to allow users to view the key frame images and quickly access the audio associated with a particular topic.

Figure 15:
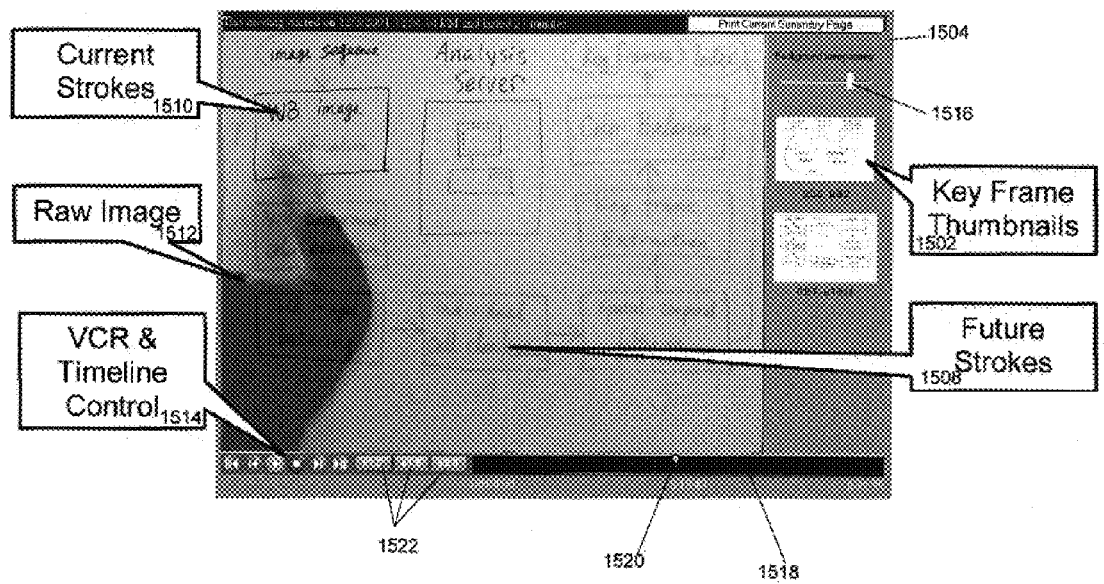
FIG. 15 is an image depicting the browser interface of the white board capture system. Each key frame image represents the whiteboard content of a key moment in the recording.

The User Interface (UI) of the browsing software is shown in FIG. 15. The primary areas of the UI include a key frame pane 1504 where key frame thumbnails 1502 (graphical representations of the key frame images) are displayed and the main display pane of the browser that shows a composition of the raw image 1512 from the camera and the current key frame image 1502. The key frame pane 1504 also incorporates a background transparency slider 1516 that allows the user to adjust the image displayed in the main display pane 1506 from the raw input image to the key frame image. Current pen strokes 1510, strokes that have already been written in the meeting playback time line, are rendered darker and more clearly than future strokes 1508, that have not yet been written in the meeting playback timeline in the main display main. The pen-strokes that the participants are going to write in the future 1508 are shown in ghost-like style. This visualization technique will be described in more detail later.

A VCR and standard timeline control 1514 is provided in the lower left corner of the browser UI, below the main display pane 1506. The VCR and standard timeline control 1514 allows the user to sequence backwards or forwards slowly or quickly in the image/audio sequence or to stop, much like the controls found on a typical VCR. A timeline bar 1518 graphically displays the length of the audio/image sequence as a bar, and provides numerical values of the start time, end time and current time of the meeting playback. A pointer 1520 on this bar 1518 can be selected and dragged forward and backward to linearly sequence forwards and backwards in the image/audio sequence.

It should be noted that even though the locations of some of the aforementioned UI elements are given, this is not meant to be limiting. These UI elements could be rendered in any location on the display, either alone or in combination with other elements.

2.4.2 Non-Linear Access to Meeting Data

Two levels of non-linear access to the recorded audio were provided in the context of visual indexing.

The first level of non-linear access is through the use of the key frame thumbnails 1502. Each key frame thumbnail has a time range associated with it on the display. The user can click a key frame thumbnail to jump to the starting point of the audio (e.g., beginning of the chapter) for the corresponding key frame.

The second level of access to the recorded audio is through the use of the pen strokes in each key frame. When the cursor is hovering over a pen stroke cell (current stroke 1510 or future stroke 1508) in the main window 1506, the cursor is changed to a "hand" symbol indicating that it is selectable (e.g., "clickable" with a mouse). Double clicking on the cell with a mouse or other input device brings the application to the audio playback mode. The playback starts from the time of the session when the clicked stroke cell was written. The time that the clicked stroke was written is the earliest time when the cell image of the same pattern appeared in the sequence. The main window starts to show the image at that time. The user can still click other stroke cells to jump to another part of the session.

Together with the VCR and standard time line control 1514, these two levels of visual indexing allow the user to browse a meeting in a very efficient way.

2.4.3 Image Viewing

As shown in FIG. 15, the thumbnails of the key frame images (e.g., 1502) are listed in the key frame pane 1504. Selecting one of the thumbnails 1502 with a mouse cursor or other input device brings the corresponding key frame image to the main window 1506 at the left and takes the application to the image viewing mode, where the user can zoom in and out using the zoom control buttons 1522, read the text and diagrams in the image, or cut and paste a portion of the image to other documents. Additionally, the entire key frame can be cut and pasted to other documents or printed as notes.

2.4.4 Whiteboard Content Visualization

Given the key frame images and the time stamp information, an image that corresponds to the whiteboard content at any given time can be reconstructed. If the image of every frame is rendered according to the audio playback time using the timeline control 1514, the main window playbacks the whiteboard content like a movie. Using this approach, the users have both the aural and visual context to the session. But they cannot click any pen stroke that takes them forward in time (future strokes 1508) because these strokes have not yet been rendered in the main window.

In the initial implementation of the Whiteboard Capture System, the future strokes were shown in a washed out mode. However, after a short trial period, the users of the browser often confused the future strokes with the strokes that were not cleanly erased. Another complaint about the interface was that although the users liked the whiteboard images without the person in front, they sometimes wanted to know who wrote the strokes.

Figure 16:
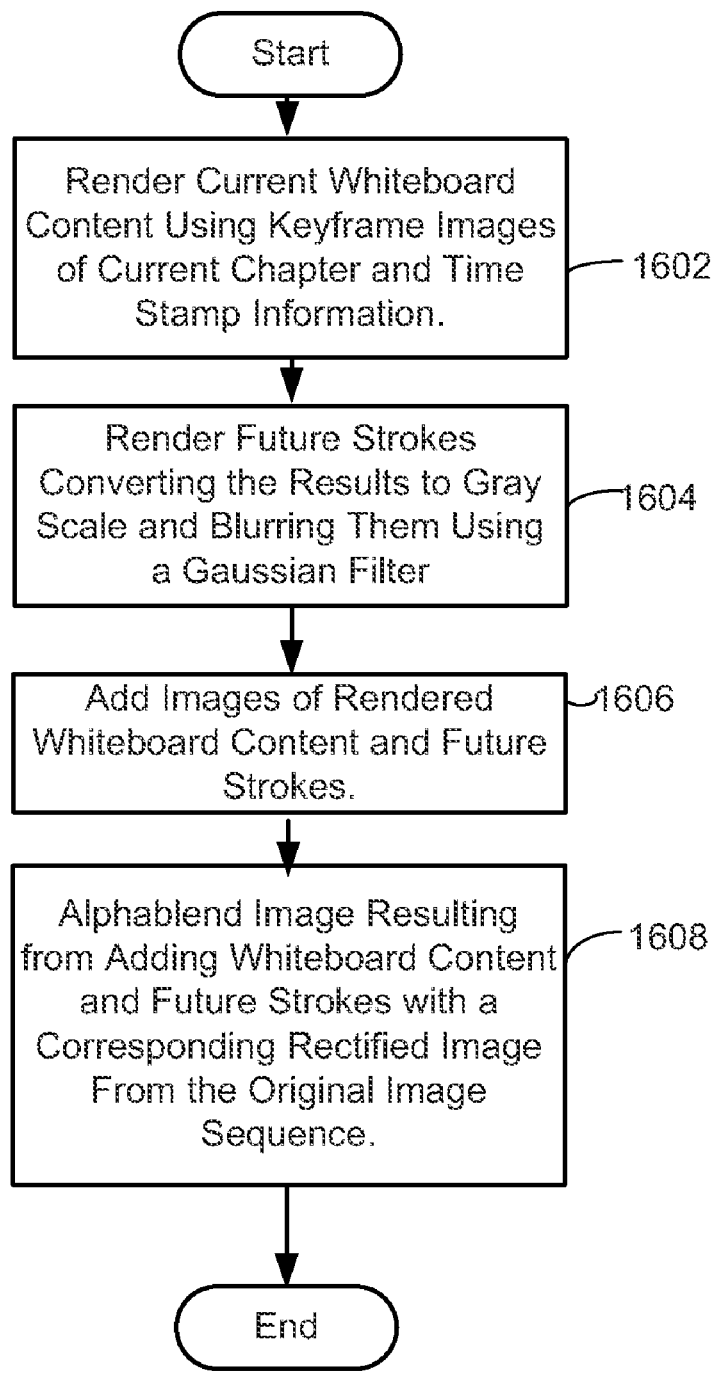
FIG. 16 is a flow chart depicting the process of displaying current and future pens strokes in the system and method according to the present invention.

After a few design iterations, the following visualization process, shown in FIG. 16, that addresses all the aforementioned concerns was decided on. The process actions of this process are as follows:

1. Render the current whiteboard content using the key frame image of the current chapter and time stamp information (process action 1602).
2. Render the Future Strokes, convert the results to grey scale, and blur them using a Gaussian filter (process action 1604).
3. Add images from Step 1 and Step 2 (process action 1606).
4. Alpha-blend the image from Step 3 with the rectified image from the input sequence (process action 1608). The rectified image is the corresponding image from the input sequence (as shown in FIG. 4) but with the non-whiteboard region cropped, followed by a remapping to a rectangular shape. The user can control the alpha value with a GUI slider (1516 of FIG. 15) from 0, showing only the rendered key frame whiteboard image, to 1, showing exactly the original rectified image. The rendered keyframe whiteboard image is the key frame image with the foreground object removed and replaced by the strokes that it occludes.

It is believed that this is a very helpful way of visualization because 1) both present and future strokes are shown on the rendered whiteboard image, allowing the user to jump both backward to the past and forward to the future, and 2) blending the rectified input image with the key frame adds the foreground object thus giving more context. See FIG. 15 for an example of such a visualization with alpha=0.8.

2.5 Security

Figure 17:
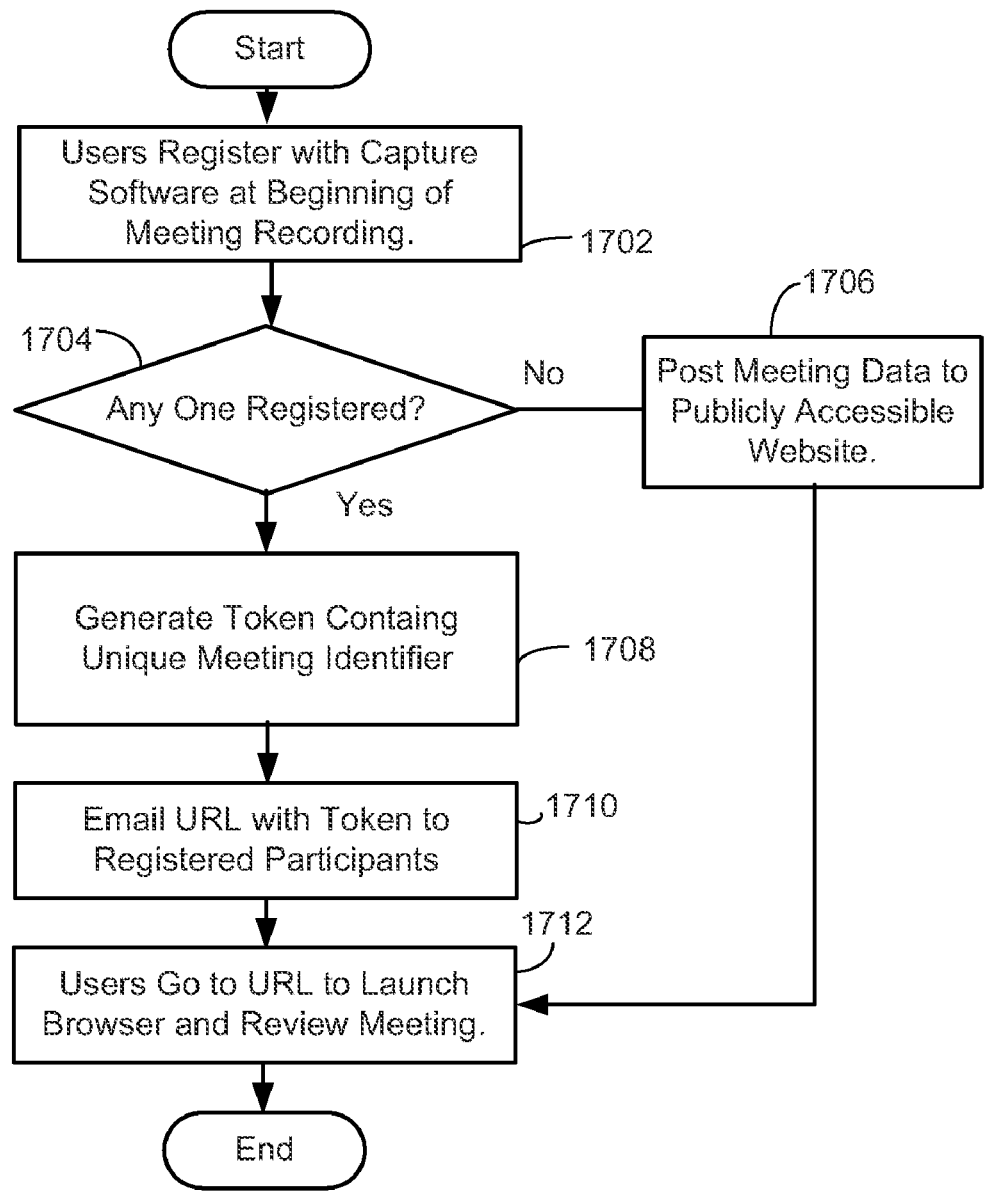
FIG. 17 is a flow chart depicting the security processing used in the system and method according to the present invention.

Meeting participants are usually apprehensive about recording a meeting because sensitive information might be viewed by unintended people. For them, keeping the recorded data secure is a concern. To address this concern, a simple token-based access security model was developed. The process actions of this process are shown in FIG. 17.

In the Whiteboard Capture System, meeting participants are asked to register with the capture software at beginning of the meeting recording (process action 1702). They can either fill in their email aliases in a dialog box on the computer screen or, to speedup the process, insert their corporate identification cards into a smart card reader to register.

All the recorded sessions reside on a web server. If no one registers, the meeting is posted on a publicly accessible web page (process actions 1704, 1706). If at least one participant registers, an access token is generated after the meeting recording and analysis (process action 1708). The token is a long randomly generated string containing a unique meeting identifier. The URL containing the token is emailed to the registered participants (process action 1710). The recipients go to the URL to launch the web browsing software to review the meeting (1712). They can also forward the URL to people who have not attended the meeting.

This simple Security-by-Obscurity model seems to work well. Other security measures could, however, be employed.

In addition to the above-discussed security feature of the Whiteboard Capture System, a privacy mode is also available while recording the meeting. Should the meeting participants say or write something that they do not wish to have recorded, a feature exists to erase the previous 15 seconds (although another prescribed period of time could be used) of both image and audio data. This erasure is initiated by pressing either a physical or GUI button

2.6 Alternate Embodiments

The above-described basic Whiteboard Capture System can be combined with many other techniques and devices to render alternate embodiments. The various embodiments discussed below can be used alone or in combination.

In one such embodiment, conventional Optical Character Recognition (OCR) is performed on the key frames to provide editable text that is easily used to create documents or presentation viewgraphs.

In another embodiment, conventional voice recognition software is used to convert the audio portion of the captured data to text. This allows the easy creation of meeting minutes and other documents. It also provides a relatively inexpensive way to provide meeting information to the hearing impaired.

The Whiteboard Capture System can also be made portable by using, for example, a notebook computer with a microphone and a camera on a tripod. This configuration only requires an additional initial calibration to determine the location of the camera relative to the whiteboard. This calibration could be performed manually by manually determining the four corners of the panel in the image, or automatically, by using such conventional methods as edge detection.

The analysis software of the Whiteboard Capture System can also be used to determine key frames with the whiteboard capture systems that use pen tracking to infer whiteboard content. Since the history of the pen coordinates is typically captured in vector form in these systems, the content on the whiteboard at any given moment can be reconstructed later. Using the Whiteboard Capture System analysis software with such a system simplifies the analysis process. There is no determination of whiteboard background color or whiteboard region rectification necessary, no spatial and temporal filtering required, and the classification of whiteboard cells is simpler because cell images will either be stroke or whiteboard, since no foreground object will interfere with the text written on the whiteboard. The cell "images" are now derived from the content inferred by the pen locations over the whiteboard area. This embodiment of the invention basically clusters the cell "images" as discussed in FIG. 5, process action 506, classifies each cell as a stroke or whiteboard cell similar to process action 508 except for that there are no foreground cells, and extracts the key frame images using the classification results (process action 512). The results can be transmitted and archived with low bandwidth and small storage requirements. Additionally, OCR can be used to transcribe the captured key frames in this embodiment also.

Additionally, in a working embodiment of the Whiteboard Capture System, the frame rate of the system is limited by the frame rate of the commercially available still cameras. To achieve higher frame rate, a high resolution video camera such as a HDTV camera can be used.

In yet another embodiment, the Whiteboard Capture System incorporates gesture recognition to use gesture commands. For instance, a command box can be written somewhere on the whiteboard. When the user motions or points to the box the system uses gesture recognition to time stamp the images at the particular time the gesture was made.

In the basic application, the analysis process assumes that the color of the whiteboard background remains constant in an input sequence. However, a known color patch can be installed above the top of the whiteboard where nobody can obscure it from the camera. The software can then adjust the camera exposure parameters for different lighting conditions on a per-frame basis, based on the known color characteristics of this easily detectable patch. This is done as follows. If the exposure parameters stay constant, the color of the patch can be different in the captured images with different lighting conditions in the room. The camera can adjust its exposure parameters given what the color of the patch is in the previous frame. The color of the patch can stay within a specified range and so will the whiteboard region.

3.0 System Performance and Usage

3.1 Background.

The design goals of the Whiteboard Capture System were that it should 1) work with any existing whiteboard; 2) capture the whiteboard content automatically and reliably; and 3) use the whiteboard content as a visual index to efficiently browse a meeting recorded using the system.

Compared to the whiteboard capture systems that use a sensing mechanism or an electronic whiteboard, the Whiteboard Capture System also had a set of unique technical challenges. Firstly, the whiteboard background color is not typically pre-calibrated (for example, by taking a picture of a blank whiteboard) because each room has several light settings that could vary from session to session. Secondly, frequently, people move between the digital camera and the whiteboard, and these foreground objects obscure some portion of the whiteboard and cast shadows on it. Within a sequence, there may be no frame that is totally un-obscured. These problems had to be dealt with in order to compute time stamps and extract key frames.

3.2 System Components

Figure 18A:
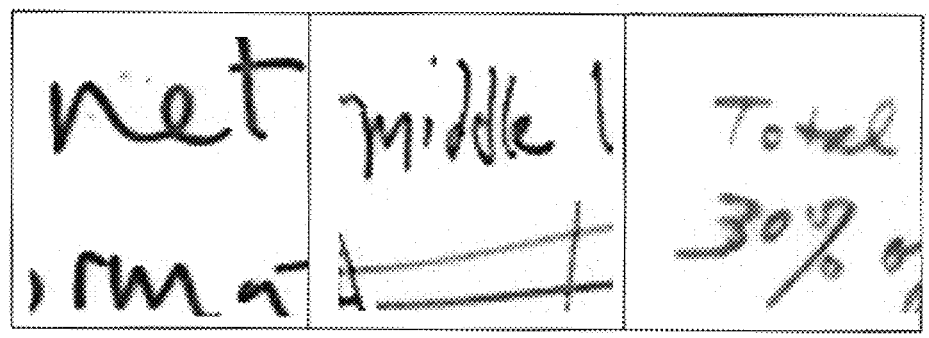
FIG. 18A provides sample images of whiteboard content taken at three installation sites of a working embodiment of the invention.

During the design of the Whiteboard Capture System, prototype systems were built and iteratively improved. Three conference rooms were equipped with a Whiteboard Capture System. Information about these three rooms is listed in Table 1 below. Sample images (80×80 pixels, approximately 96 point font on the board) are shown in FIG. 18A (images correspond from left to right to Room 1, Room 2 and Room 3, respectively).

TABLE 1

Information About Three Installation Sites

|  | Room 1 | Room 2 | Room 3 |
| --- | --- | --- | --- |
| Board Dimension (feet) | 4 × 3 | 8 × 5 | 12 × 5 |
| Key Frame Image Dimension (pixel) | 1200 × 900 | 2400 × 1500 | 2400 × 1000 |
| Resolution (dpi) | 25 | 25 | 16.7 |

Figure 18B:
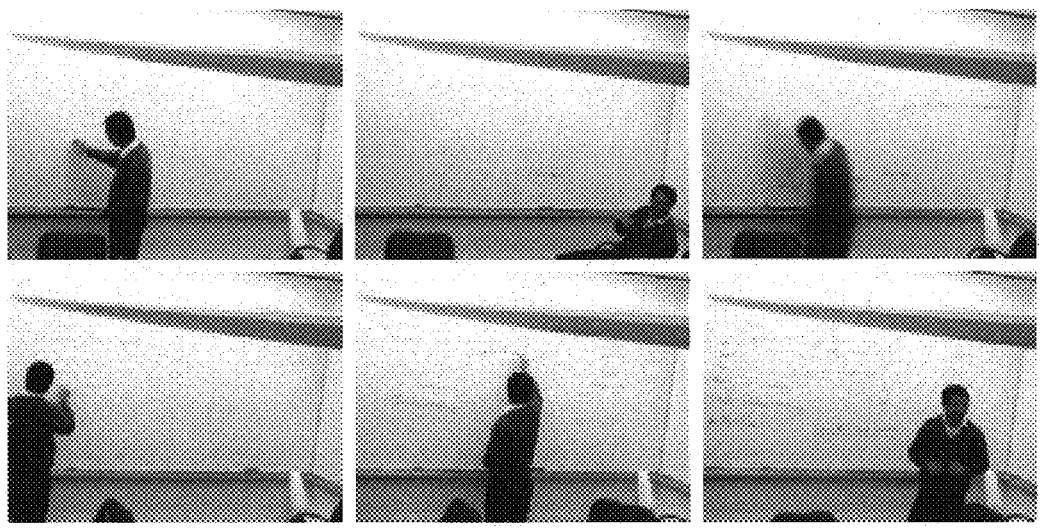
FIGS. 18B, 18C and 18D is a series of figures depicting the input (FIG. 18B) and output, key frame images, (FIGS. 18C and 18D) of a working embodiment of the present invention.
Figure 18C:
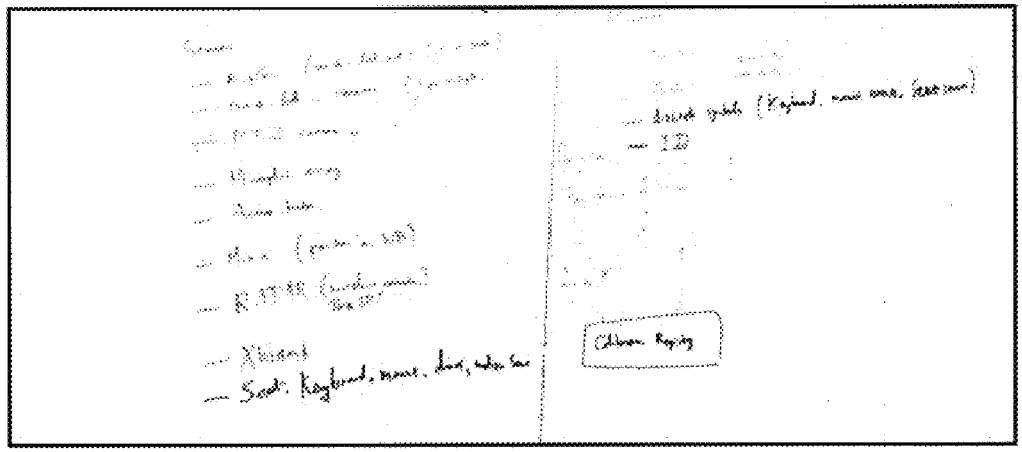
Figure 18D:
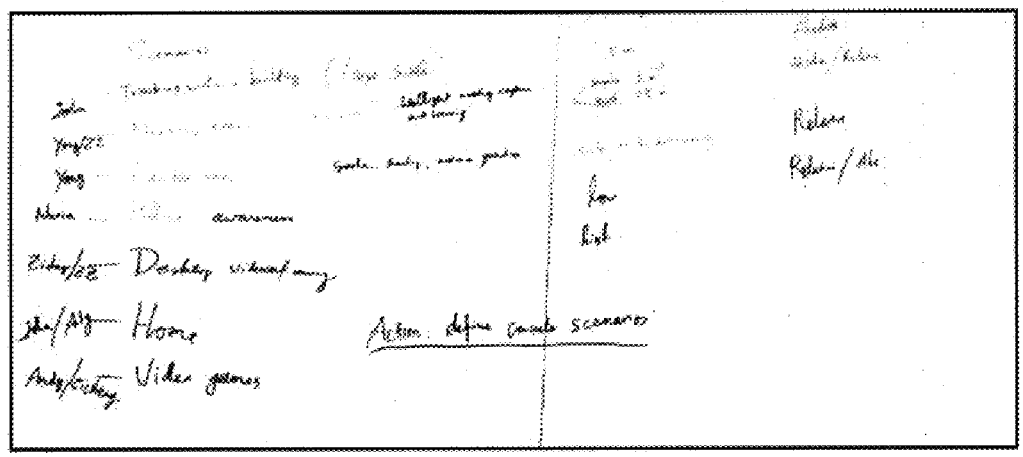

The sizes of whiteboards in those rooms varied and so did the qualities of the key frame images produced. As can be seen from the sample images (FIG. 18A), the writings on a 12'×5' board are fuzzier (far right) than the ones on the other two boards because the resolution is maxed out for a 4 mega-pixel input image. Nevertheless, they are still quite legible. Several selected frames from a session using a 12'×5' whiteboard (FIG. 18B) and the corresponding key frame images (FIGS. 18C and 18D) are also shown.

Since the system is to work with any existing whiteboard, without the need for special pens and erasers, a direct capture device, a still camera, was chosen to capture the whiteboard content. In the exemplary working embodiment of the Whiteboard Capture System, a Canon® PowerShot G2 digital still camera with 4 mega pixels was used. This camera provides images that are 2272 pixels by 1704 pixels—equivalent to 31.6 dpi for a 6' by 4' board. One important reason that this camera was chosen was due to the availability of a software development kit that allows customized software solutions to be written to control the camera from a PC. This software can specify virtually all the camera parameters on a per-shot basis. Since the system takes pictures of the whiteboard directly, there is no misregistration of the pen strokes. As long as the users turn on the system before erasing, the content is preserved.

The analysis server runs on a Pentium III 800 MHz dual CPU PC. The analysis process takes about 20 minutes for every hour of session time. The storage requirement for the 16 bit 11 KHz mono audio takes about 15 Mb per hour using MP3 encoding. The input image sequence requires about 34 Mb per hour using Motion JPEG compression.

The systems installed in the three conference rooms were used frequently by various teams. Over the course of 6 months, 108 sessions totaling 48 hours were recorded—averaging 27 minutes per session and 4.5 sessions per week. The average number of key frames per session was 2.7. The key frame images were saved in JPEG format. The average image size was 51.8 Kb. The sizes ranged from 17 Kb to 150 Kb. Because the JPEG compression worked extremely well on the uniform white background, the image size was more related to how much the users write on the board than the image dimension.

All users of the system believed that the system is very useful for meetings that use a whiteboard extensively. The key frame images and the visual indexing capability not only allow the participants to review a meeting at a later time, but also allow the users who did not attend the meeting to understand the gist of the meeting in a fraction of the actual meeting time.

Some users found new ways to use the system that were not intended initially. Take the example of status meetings that usually did not require writing on whiteboard. People still turned on the whiteboard capture system. When it was someone's turn to speak, the manager wrote his/her name on the board so that the speech segments could be easily found later in the recorded audio by clicking on the names in the key frame image. Another example is during a brainstorm session, when someone thought of a good idea, he wrote a star on the side of the board and said it aloud. The audio can then be retrieved later by clicking on the star.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Appendix: Plane-Based Whiteboard Color Estimation

Only one component of the color image is considered, but the technique described below applies to all components (R, G, B, or Y). Each cell i is defined by its image coordinates $(x_i, y_i)$. Its color is designated by $z_i$ (z=R, G, B, or Y). The color is computed as described in Section 2.3.2, and is therefore noisy and even erroneous. From experience with the meeting rooms, the color of the whiteboard varies regularly. It is usually much brighter in the upper part and becomes darker toward the lower part, or is much brighter in one of the upper corners and becomes darker toward the opposite lower corner. This is because the lights are installed against the ceiling. Therefore, for a local region (e.g., 7×7 cells), the color can be fit accurately by a plane; for the whole image, a plane fitting is still very reasonable, and provides a robust indication whether a cell color is an outlier.

A plane can be represented by ax+by+c−z=0. A set of 3D points $\{(x_i, y_i, z_i)\ i=1, \ldots, n\}$ with noise only in $z_i$ is given. The plane parameters $p=[a,b,c]^T$ can be estimated by minimizing the following objective function: $F=\Sigma_i f_i^2$, where $f_i=ax_i+by_i+c-z_i$. The least-squares solution is given by $p=(A^T A)^{-1} A^T z$, where $$A = \begin{bmatrix} x_1 & y_1 & 1 \\ \cdots & \cdots & \cdots \\ x_n & y_n & 1 \end{bmatrix}$$

and $z=[z_1, \ldots, z_n]^T$. Once the plane parameters are determined, the color of the cell i is replaced by $\hat{z}_i=ax_i+by_i+c$.

The least-squares technique is not robust to erroneous data (outliers). As mentioned earlier, the whiteboard color initially computed does contain outliers. In order to detect and reject outliers, a robust technique to fit a plane to the whole whiteboard image is used. The least-median-squares [11], a very robust technique that is able to tolerate near half of the data to be outliers, is used. The idea is to estimate the parameters by minimizing the median, rather than the sum, of the squared errors, i.e., $$\min_p \ \mathrm{median}_i \ f_i^2.$$

First m random subsamples of 3 points are drawn (3 is the minimum number to define a plane). Each sub-sample gives an estimate of the plane. The number m should be large enough such that the probability that at least one of the m sub-samples is good is close to 1, say 99%. If it is assumed that half of the data could be outliers, then m=35, therefore the random sampling can be done very efficiently. For each sub-sample, the plane parameters and the median of the squared errors $f_i^2$ are computed. The plane parameters that give the minimum median of the squared errors were retained, denoted by M. Then the so-called robust standard deviation $\sigma=1.4826\sqrt{M}$ (the coefficient is used to achieve the same efficiency when no outliers are present) is computed. A point i is considered to be an outlier and discarded if its error $|f_i|>2.5\sigma$. Finally, a plane is fit to the good points using the least-squares technique described earlier. The color of an outlier cell i is replaced by $\hat{z}_i=ax_i+by_i+c$.

Wherefore, what is claimed is:

1. A process for summarizing and indexing audiovisual content, comprising the following process actions:
   capturing a sequence of images of content written on a non-electronic white board with a camera;
   recording audio signals correlated with the sequence of images; and
   analyzing the sequence of images to isolate key frames summarizing key points of said board content; wherein said analyzing process action comprises the following process actions:
      rectifying a view of the whiteboard in every image in the sequence of images;
      extracting whiteboard background color;
      dividing each image of the sequence of images into cells, each cell representing a cell image;
      clustering cell images throughout the sequence of images for each cell over time;
      classifying each cell image as a stroke, a foreground object or whiteboard cell; and
      extracting key frame images using the classification results.

2. The process of claim 1 further comprising correlating said audio recordings with said key frames.

3. The process of claim 2 wherein said audio signals are correlated with said sequence of images by time stamps associated with both the recorded audio and the sequence of images.

4. The process of claim 3 wherein correlating the audio signals with said sequence of images comprises the process actions of:
   time stamping said sequence of images with a common clock at the time the images are captured;
   time stamping said audio signals with a common clock at the time the audio signals are recorded; and
   correlating the sequence of images and audio signals using the time stamps of the common clock.

5. The process of claim 3 further comprising accessing said sequence of images and said correlated audio signals at a desired point in said sequence of images.

6. The process of claim 5 wherein said key frames are used to select said desired point in said sequence.

7. The process of claim 1 further comprising the process action of filtering cell images spatially to refine classification results.

8. The process of claim 1 further comprising the process action of filtering the cell images temporally to refine classification results.

9. The process of claim 1 further comprising color balancing the key frame images to improve image quality.

10. The process of claim 1 wherein rectifying said whiteboard further comprises:
    specifying the four corners of said whiteboard in an image;
    cropping any non-whiteboard region of each image; and
    performing a bi-linear warp to a rectangular shape for each whiteboard region using bi-cubic interpolation to obtain a cropped and rectified whiteboard image in each captured image of the sequence of images.

11. The process of claim 1 wherein the process action for extracting whiteboard background color comprises:
    determining whiteboard cells with the brightest luminance and smallest variance;
    determining any holes in whiteboard color; and
    filling each hole by searching whiteboard cells around said hole and setting color to nearest cell that is not a hole.

12. The process of claim 1 wherein the process action for determining any holes in the whiteboard comprises the process actions of:
    specifying a range of colors that a whiteboard cell can be;
    examining each whiteboard cell for being outside said range of colors; and
    designating any cell having a color outside said range as a hole.

13. The process of claim 1 wherein the process action for extracting whiteboard background color comprises:
    histogramming whiteboard image luminance;
    determining peak whiteboard luminance;
    designating color corresponding to peak luminance as initial whiteboard color;
    determining any whiteboard color outliers, said outliers representing erroneous data;
    marking any outliers as holes; and
    filling each hole by searching cells around hole and setting color to that of nearest cell that is not a hole.

14. The process of claim 13 further comprising filtering whiteboard color image after filling each hole.

15. The process of claim 14 wherein outliers are detected using a least-median squares technique.

16. The process of claim 15 wherein the least-median squares technique comprises the following process actions:
    fitting a plane in the luminance Y or RGB space by minimizing the median of the squared errors; and
    designating cells that do not follow this model as outliers.

17. The process of claim 14 wherein filtering said whiteboard image comprises fitting a plane in red, green, blue (RGB) color space.

18. The process of claim 1 wherein the process action for dividing each image up into cells comprises dividing each image into rectangular cells.

19. The process of claim 1 wherein the process action for dividing each image into cells comprises dividing each image into cells wherein cell size is approximately the same size of a single written character on the board.

20. The process of claim 18 wherein the cell size corresponds to a region of 1.5 inches by 1.5 inches in the whiteboard.

21. The process of claim 18 wherein the cell size is determined by camera resolution and whiteboard size.

22. The process of claim 14 wherein the cell size is 1 pixel by 1 pixel.

23. The process of claim 1 wherein the process action for clustering cell images comprises clustering cell images that are considered to be the same over time.

24. The process of claim 23 wherein the process action of clustering cell images that are considered to be the same over time comprises the action of determining if cell images are the same by using a normalized cross-correlation technique to compare two cells at a time.

25. The process of claim 24 wherein the cross-correlation score ranges from −1, for two images not similar at all, to 1, for two identical images.

26. The process of claim 25 further comprising a process action of applying a Mahalanobis distance test to determine if two cells are the same.

27. The process of claim 26 wherein the Mahalanobis distance test given by $d=|\bar{I}-\bar{I}'|/(\sigma+\sigma')$; where i is the first cell image and I' is the second cell image, $\bar{I}$ is the mean color of the first cell image, $\bar{I}'$ is the mean color of the second cell image, σ is the standard deviation from $\bar{I}$ and σ' is the standard deviation from $\bar{I}'$ and wherein I and I' are the two cell images are considered to be identical if and only if $d<T_d$ and $c>T_c$, and wherein $T_d=2$ and $T_c=0.707$ in one particular embodiment.

28. The process of claim 1 wherein the cell classifying process action further comprises:
   designating a cell image as a whiteboard cell if the RGB values are approximately the same;
   designating a cell image as a stroke cell if said cell is mostly white or gray with one or two primary colors mixed in; and
   designating a cell image as a foreground cell if it does not have the characteristics of a whiteboard cell or a stroke cell.

29. The process of claim 1 wherein the cell classifying process action further comprises:
   determining the color distribution of a current cell image;
   determining the color distribution of the corresponding whiteboard cell and
   determining if the color distribution of the current cell image and the corresponding whiteboard cell are the same, not the same but having a strong similarity or are totally different.

30. The process of claim 28 wherein the cell image is classified as a whiteboard cell if and only if $|\bar{I}-\bar{I}_w|/(\sigma+\sigma_w)<T_w$ and $\sigma/\sigma_w<T_\sigma$ where $\bar{I}_w$ is the whiteboard color, $\sigma_w$ is the standard deviation from $\bar{I}_w$, $\bar{I}$ is the mean color of the current cell and o is the standard deviation of $\bar{I}$; wherein $T_w=2$ and $T_\sigma=2$.
   otherwise, it is classified as a foreground object cell.

31. The process of claim 7 wherein the process action of spatially filtering the cell images comprises the following process actions:
   identifying isolated foreground cells;
   reclassifying isolated foreground cells as stroke cells;
   identifying stroke cells that are connected to foreground cells; and
   reclassifying the stroke cells that are connected to foreground cells are foreground cells.

32. The process of claim 8 wherein the process action of temporally filtering the cell images comprises the following process actions:
   evaluating each cell over time to determine if it contained the same stroke cell before and after it was classified as a foreground cell; and
   if a cell was classified as the same stroke cell before and after it was classified as a stroke cell, classifying it as a stroke cell.

33. The process of claim 1 wherein the key frame extracting process action comprises:
   inputting the classification results;
   counting the stroke cells for each frame in the sequence of images;
   using the stroke count for the frames to determine the peaks and valleys of the stroke count;
   if the difference between each adjacent peak and valley exceeds a prescribed threshold, designating the data between valleys as chapters and the peak within each chapter as the key frame representing the chapter.

34. The process of claim 33 wherein the prescribed threshold is 20 percent of the total stroke count.

35. The process of claim 33 further comprising the process action of reconstructing said key frame images.

36. The process of claim 35 wherein said process action of reconstructing said key frame images further comprises the following process actions:
   inputting the classified cell images of the sequence of images and key frames divided into cell images;
   if a key frame cell image is classified as a whiteboard image or a stroke image, its image is rendered;
   if a key frame foreground cell image is within the span of a stroke, this cell image is rendered with the stroke cell image from neighboring images in the sequence;
   if the key frame cell image is not classified as a whiteboard image, a stroke image or a foreground cell within the span of a stroke, it is filled rendered as a whiteboard image.

37. The process of claim 9 wherein the color balancing of the key frame images to improve image quality further comprises the process actions of:
   making the background uniformly white and increasing the color saturation of pen strokes by using mean whiteboard color to scale the color of each pixel in a cell; and
   reducing image noise.

38. A system for capturing the audio and video content of a meeting comprising:
   a capture system that captures a sequence of images of data written on a whiteboard and audio signals corresponding to sounds that occur during a meeting;
   an analysis server for analyzing the sequence of images that extracts key data frames written on the whiteboard and correlates the audio signals to the key data frames wherein the analysis server identifies the key data frames by:
      rectifying a view of the whiteboard in every image in the sequence of images;
      extracting whiteboard background color;
      dividing each image of the sequence of images into cells of cell images;
      clustering cell images that are similar throughout the sequence of images for each cell over time;
      classifying each cell image as a stroke, a foreground object or whiteboard cell; and
      extracting key frame images using the classification results; and
   a browsing module for viewing the analyzed meeting key data frames and correlated audio.

39. The system of claim 38 wherein the capture system further comprises:
   a camera positioned to capture sequence of images;
   a microphone to record the audio signals; and
   a computer for recording the sequence of images and the audio signals.

40. The system of claim 39 wherein the camera is at least one of:
   a still camera; and
   a video camera.

41. The system of claim 39 wherein the camera is zoomed in as close to the whiteboard as possible to maximize resolution.

42. The system of claim 39 wherein the camera is aligned as parallel to the whiteboard as possible to minimize scene depth.

43. A system for capturing the audio and video content of a meeting comprising:
   a capture system that captures a sequence of images of data written on a whiteboard and audio signals corresponding to sounds that occur during a meeting, wherein
      one or more users register a user identifier at the capture unit before recording starts;
      if at least one user registers at the capture unit, the analysis server generates an access token after event recording and analysis;
      the access token and computer memory location of analyzed meeting data is provided to the registered user identifiers; and
      the one or more users access the computer memory location of the analyzed event data to review the analyzed meeting data;
   an analysis server for analyzing the sequence of images that extracts key data frames written on the whiteboard and correlates the audio signals to the key data frames; and
   a browsing module for viewing the analyzed meeting key data frames and correlated audio.

44. The system of claim 43 wherein the user identifier is an email address.

45. The system of claim 43 wherein the computer memory location of the analyzed event data is an address of an Internet web site.

46. The system of claim 38 further comprising a privacy feature in said capture unit that allows a user erase at least one of:
   portions of the sequence images; and
   portions of the audio.

47. The system of claim 46 wherein said privacy feature is activated by pressing either a graphical user interface button or a physical button.

48. The system of claim 38 wherein the capture system is portable.

49. A process for distilling event content, comprising the following process actions:
   capturing a sequence of images of content written on a non-electronic white board with a camera;
   recording audio signals correlated with the sequence of images; and
   analyzing the sequence of images to isolate key frames summarizing key points of said board content by:
      rectifying a view of the whiteboard in each image in the sequence of images;
      extracting whiteboard background color;
      dividing each image of the sequence of images into cells;
      clustering cell images throughout the sequence of images for each cell over time;
      classifying each cell image as a stroke, a foreground object or whiteboard cell; and
      extracting key frame images using the classification results.

50. The process of claim 49 wherein the analyzing process action further comprises using Optical Character Recognition techniques to provide editable text from key frame images.

51. The process of claim 49 wherein the analyzing process action further comprises using voice recognition techniques to convert the audio to text.

52. The process of claim 49 further comprising using gesture recognition techniques.

53. The process of claim 49 wherein said capturing process action further comprises:
   installing a color patch of known color characteristics above the whiteboard;
   capturing said color patch in an image in said sequence of imdages;
   determining the color exhibited by the color patch in the image;
   capturing said color patch in the next image in said sequence of images;
   determining the color exhibited by the color patch in said next image;
   determining if the color exhibited by the patch has changed between the image and the next image by more than a prescribed threshold; and
   if the color exhibited exceeds the threshold adjusting the exposure parameters of the camera to a setting which would have made the color of said color patch in the next image, had the camera been set to said exposure setting, match the color of the color patch exhibited in the image.

54. The process of claim 53 wherein said adjusting process action is performed on every image captured.

55. A system for distilling the content of a meeting comprising:
   a capture system that captures a sequence of data written on a whiteboard, said capture system tracking pen location to infer content written on a whiteboard and recording audio signals correlating to said content written on a whiteboard;
   an analysis server for analyzing the sequence of images that extracts key data frames written on the whiteboard and correlates the audio signals to the key data frames, wherein said analysis server performs the following actions:
      dividing each region of the whiteboard into cells;
      clustering cells that are the same throughout the sequence of data written for each cell over time;
      classifying each cell as a stroke or a whiteboard cell; and
      extracting key frame images using the classification results.

56. The system of claim 55 wherein the whiteboard cells are divided into cells that are approximately the size of one written character.

57. A computer-readable medium having computer-executable instructions for providing non-linear access to data recorded during a meeting, said computer executable instructions comprising program modules for:
   capturing a sequence of images of content written on a non-electronic white board with a camera;
   recording audio signals correlated with the sequence of images; and
   analyzing the sequence of images to isolate key frames summarizing key points of said board content by:
      rectifying a view of the whiteboard in each image in the sequence of images;
      extracting whiteboard background color;
      dividing each image of the sequence of images into cells;
      clustering cell images throughout the sequence of images for each cell over time;
      classifying each cell image as a stroke, a foreground object or whiteboard cell; and
      extracting key frame images using the classification results.

* * * * *